US012373300B2

(12) United States Patent
Singh et al.

(10) Patent No.: US 12,373,300 B2
(45) Date of Patent: Jul. 29, 2025

(54) FULL SNAPSHOT SELECTION FOR REVERSE OPERATIONS

(71) Applicant: Rubrik, Inc., Palo Alto, CA (US)

(72) Inventors: Harmandeep Singh, Bengaluru (IN); Shubham Tagra, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 33 days.

(21) Appl. No.: 18/405,384

(22) Filed: Jan. 5, 2024

(65) Prior Publication Data

US 2025/0225035 A1    Jul. 10, 2025

(51) Int. Cl.
*G06F 11/14* (2006.01)
(52) U.S. Cl.
CPC ...... *G06F 11/1451* (2013.01); *G06F 11/1464* (2013.01)
(58) Field of Classification Search
CPC .......................... G06F 11/1451; G06F 11/1464
See application file for complete search history.

(56) References Cited

U.S. PATENT DOCUMENTS

| | | | | |
|---|---|---|---|---|
| 9,645,892 B1* | 5/2017 | Patwardhan | ........ | G06F 11/1466 |
| 10,754,844 B1* | 8/2020 | Jain | ..................... | G06F 16/2358 |
| 10,990,581 B1* | 4/2021 | Jain | ..................... | G06F 16/2358 |
| 11,579,981 B2* | 2/2023 | Vig | ..................... | G06F 11/1451 |
| 2024/0362121 A1* | 10/2024 | Mitkar | ................ | G06F 9/45558 |

OTHER PUBLICATIONS

Ask Leo! YouTube, What Do I Do if my Backup Drive is Full? Jul. 30, 2021. https://www.youtube.com/watch?v=9YpjRmu7Fts (Year: 2021).*

* cited by examiner

*Primary Examiner* — Matthew M Kim
*Assistant Examiner* — Kayo Lisa Rusin
(74) *Attorney, Agent, or Firm* — Holland & Hart LLP

(57) ABSTRACT

Methods, systems, and devices for data management are described. In some systems, a data management system (DMS) may obtain a full snapshot of a data block and incremental snapshots that include data associated with changes to partitions of the data block since the full snapshot. The full snapshot and the incremental snapshots may be stored as a snapshot chain. A most recently obtained incremental snapshot in the chain may be marked for deletion. Accordingly, the DMS may select, from the snapshot chain, an incremental snapshot to convert to a new full snapshot as part of a reverse operation. The incremental snapshot may be a next most recent incremental snapshot in the snapshot chain that is not marked for deletion. The DMS may perform the reverse operation to reverse an order of the snapshot chain and convert the incremental snapshot to the new full snapshot.

20 Claims, 11 Drawing Sheets

FULL SNAPSHOT SELECTION FOR REVERSE OPERATIONS

FIELD OF TECHNOLOGY

The present disclosure relates generally to data management, including techniques for full snapshot selection for reverse operations.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
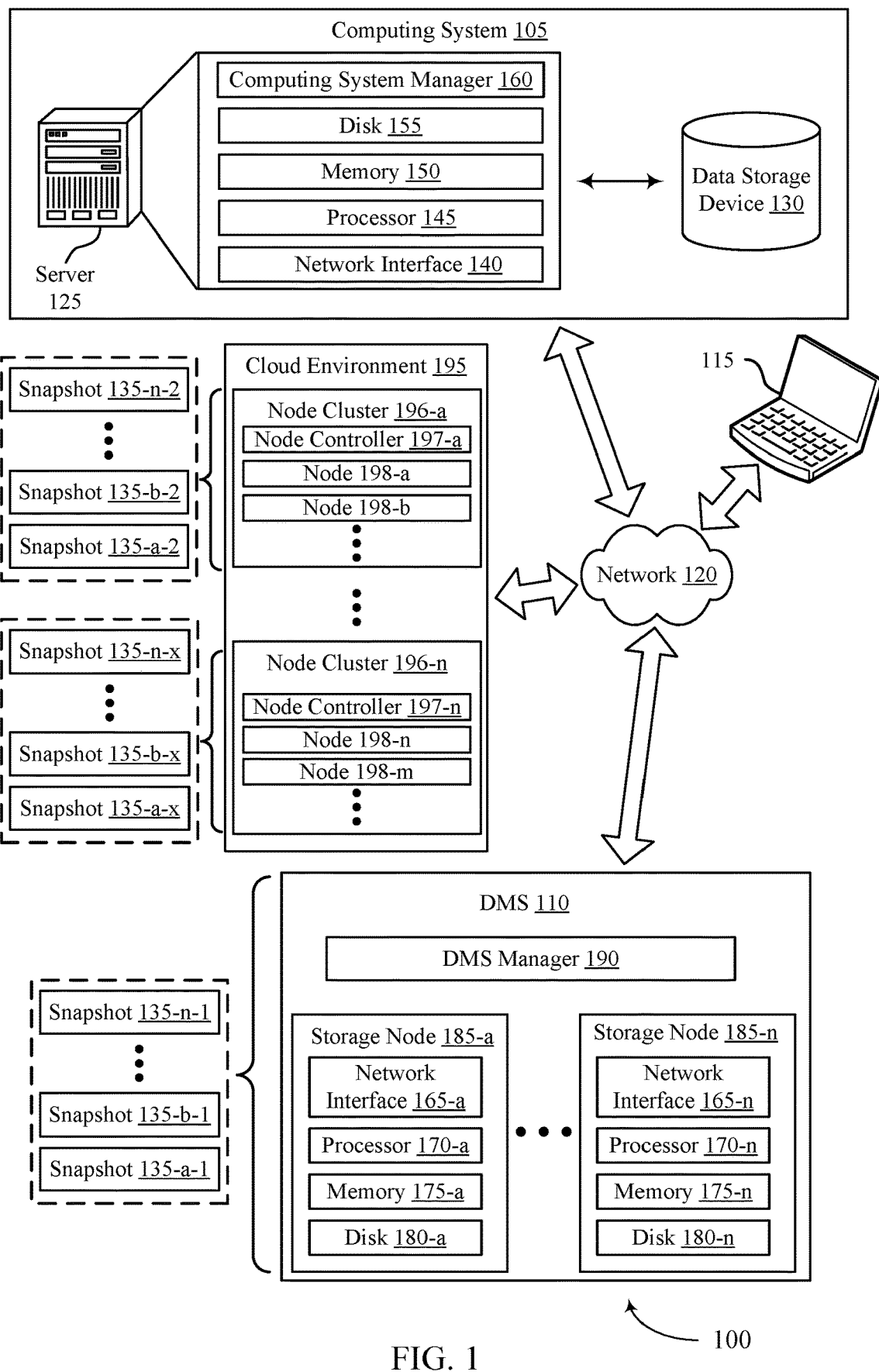
FIG. 1 illustrates an example of a computing environment that supports full snapshot selection for reverse operations in accordance with aspects of the present disclosure.

A data management system (DMS) may manage backup and restoration of data for one or more customers. To back up a data block, the DMS may, in some examples, obtain a full snapshot of the data block at a first time. The full snapshot may include data associated with each partition of the data block (e.g., all data stored in the data block at the first time). The DMS may subsequently obtain incremental snapshots that store data associated with changes to any of the partitions of the data block since the first time. The incremental snapshots may include empty data sets in any partition that did not change since the first time. The DMS may store the full snapshot and subsequent incremental snapshots as a snapshot chain, where each incremental snapshot depends from the full snapshot and the other snapshots that were obtained before the incremental snapshot. To reduce latency associated with recovering a point-in-time version of the data, the DMS may perform a reverse operation to shuffle the order of data in the snapshot chain. The reverse operation may convert a most recently obtained incremental snapshot in the snapshot chain to a full snapshot that includes the most recent data associated with each partition of the data block.

The DMS may not reverse a snapshot chain that exceeds a threshold size and/or a threshold length. Thus, the DMS may "cap" the snapshot chain to create a portion of the snapshot chain that is less than or equal to the threshold length and/or size, and the DMS may reverse the capped portion. The size of the snapshot chain may refer to a total amount of data stored within the snapshot chain (e.g., a total sum of physical sizes of the snapshot files in the snapshot chain, starting from the full snapshot). The length of the snapshot chain may refer to a quantity of snapshots that are included in the snapshot chain. However, in some examples, a most recent snapshot in the capped portion of the snapshot chain may be expired (e.g., has been marked for deletion by a user). If the DMS makes the expired snapshot the new full snapshot, the DMS may utilize input/output (I/O) resources to generate a new full snapshot for an expired snapshot. The expired full snapshot may not be garbage collected for a relatively long time period, which may be relatively space-inefficient. As such, generating a new full snapshot for an expired snapshot may result in relatively inefficient processing and consumption of computing resources.

Techniques, systems, and devices described herein provide for a DMS to select a candidate snapshot to be the new full snapshot before performing a reverse operation. For example, the DMS may refrain from automatically selecting a most recent snapshot in a snapshot chain to convert to a full snapshot. Instead, the DMS may check whether the most recent snapshot is expired. If the most recent snapshot is expired, the DMS may identify a next most recent snapshot in the snapshot chain that is not expired. The DMS may select the next most recent unexpired snapshot to use as the new full snapshot for the reverse operation. The DMS may perform the reverse operation to reverse the snapshot chain such that the selected snapshot becomes a full snapshot and previous snapshots in the chain are garbage collected or store previous incremental data. The most recent incremental snapshot that was not selected because it had expired will be garbage collected in a next consolidation operation. The DMS may thereby perform a more efficient reverse operation by selecting a non-expired snapshot as the full snapshot.

FIG. 1 illustrates an example of a computing environment 100 that supports full snapshot selection for reverse operations in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may back up a data block or some other type of computing resource for a customer. For example, the DMS 110 may obtain snapshots 135 over time of the data block. The DMS 110 may store the snapshots 135 in the form of a snapshot chain, with a first snapshot 135 in the chain being a full snapshot of the data block and remaining snapshots 135 in the chain being incremental snapshots that show changes to partitions of the data block since the full snapshot 135 was obtained. The incremental snapshots 135 may include empty data sets in any partition that did not change since the first time at which the full snapshot 135 was obtained. Each incremental snapshot 135 in the snapshot chain may depend from the full snapshot 135 and the other snapshots 135 that were obtained before the incremental snapshot 135. To recover a point-in-time version of the data block, the DMS 110 may need to access an incremental snapshot 135 associated with the point-in-time and all snapshots 135 in the snapshot chain 135 from which the incremental snapshot 135 depends. If the snapshot chain is relatively long, such recovery processes may be associated with relatively high latency, I/O operations, and processing. To reduce latency associated with recovering a point-in-time version of the data block, the DMS 110 may perform a reverse operation to shuffle the order of data in the snapshot chain. The reverse operation may convert a most recently obtained incremental snapshot 135 in the snapshot chain to a full snapshot 135 that includes the most recent data associated with each partition of the data block. However, if at least one of the snapshots 135 in the chain is expired (e.g., has been marked for deletion by a user), such a reverse operation may be associated with multiple read and write operations, including write operations to the expired snapshot 135.

In some examples, the DMS 110 may perform consolidation and garbage collection inline as part of the reverse operation. For example, as part of the reverse operation, the DMS 110 may perform write operations to move data from the full snapshot 135 or other earlier incremental snapshots 135 in the snapshot chain to more recent snapshots 135 in the snapshot chain that satisfy a set of conditions. The conditions may be that the more recent snapshots 135 to which data is to be moved are not marked for deletion by a user (e.g., are non-expired snapshots) and include an empty data set in the respective partition associated with the data to be moved. For example, if the full snapshot 135 includes data associated with a first partition of the data block, and all other snapshots 135 in the snapshot chain include an empty data set in the first partition, then the DMS 110 may write the data from the full snapshot 135 to a most recent snapshot 135 in the snapshot chain that is not expired. The DMS 110 may repeat such writing until the most recent non-expired snapshot 135 in the snapshot chain includes data associated with each partition and thereby becomes a full snapshot 135.

In some cases, there may be a threshold size or a threshold length, or both, associated with the reverse operation. The DMS 110 may not reverse a snapshot chain that exceeds the threshold size and/or threshold length. Thus, the DMS 110 may "cap" the snapshot chain to create a portion of the snapshot chain that is less than or equal to the threshold length and/or size, and the DMS 110 may reverse the capped portion. However, in some examples, a most recent snapshot 135 in the capped portion of the snapshot chain may be expired (e.g., has been marked for deletion by a user). If the DMS 110 makes the expired snapshot 135 the new full snapshot, the DMS may utilize I/O resources to generate a new full snapshot 135 for an expired snapshot, and the expired full snapshot 135 may not be garbage collected for a relatively long time period, which may result in relatively inefficient processing and consumption of computing resources.

Techniques, systems, and devices described herein provide for a DMS 110 to select a candidate snapshot 135 to be the new full snapshot 135 before performing a reverse operation. For example, the DMS 110 may refrain from automatically selecting a most recent snapshot 135 in a snapshot chain to convert to a full snapshot 135. Instead, the DMS 110 may check whether the most recent snapshot 135 is expired. If the most recent snapshot 135 is expired, the DMS 110 may identify a next most recent snapshot 135 in the snapshot chain that is not expired. The DMS 110 may select the next most recent unexpired snapshot 135 to use as the new full snapshot for the reverse operation. The DMS 110 may perform the reverse operation to reverse the snapshot chain such that the selected snapshot 135 becomes a full snapshot 135 and previous snapshots 135 in the chain are garbage collected or store previous incremental data. The most recent incremental snapshot 135 that was not selected because it had expired will be garbage collected in a next consolidation operation. The DMS 110 may thereby perform a more efficient reverse operation by selecting a non-expired snapshot as the full snapshot 135.

Figure 2:
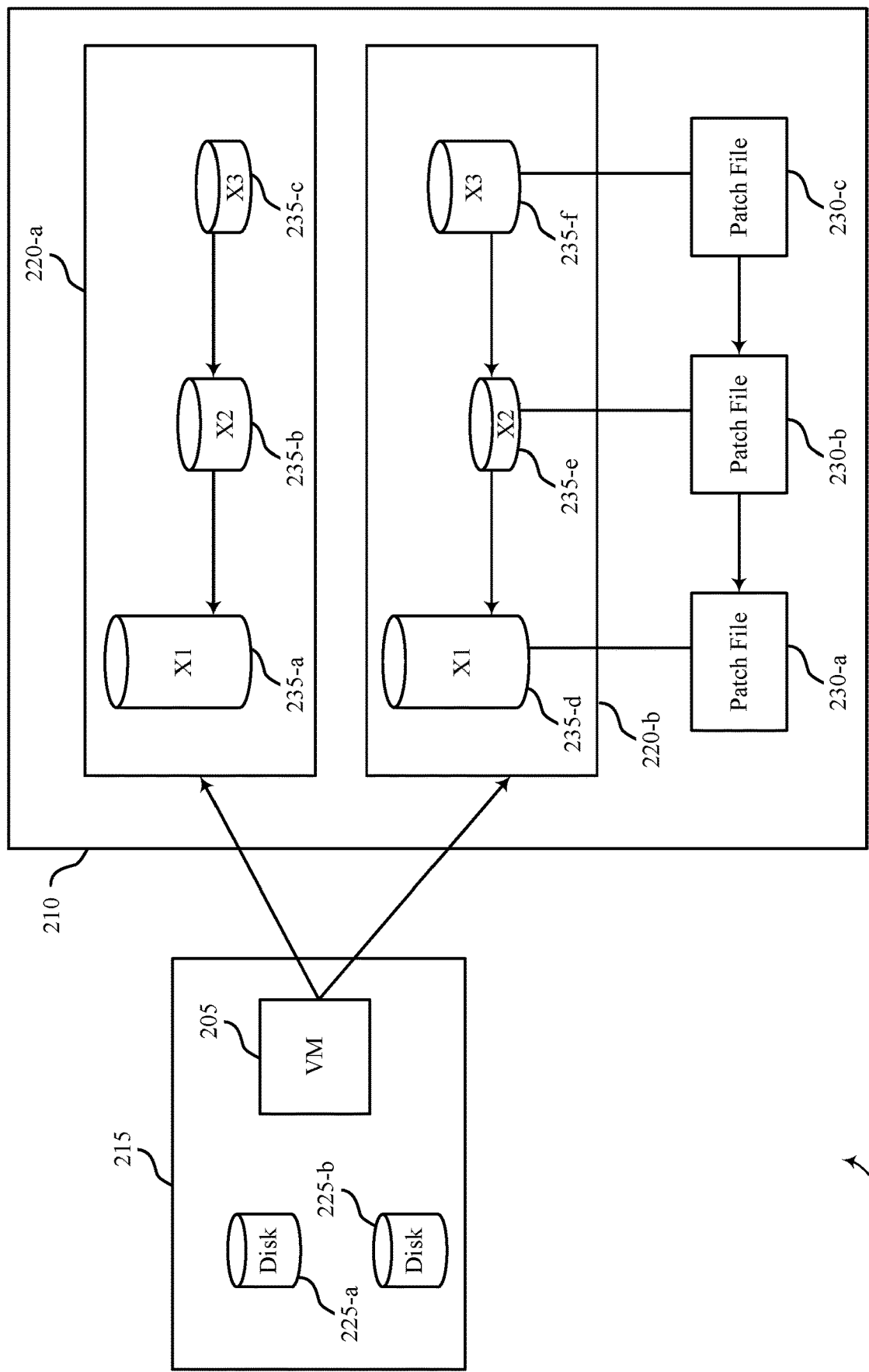
FIG. 2 shows an example of a snapshot chain storage architecture that supports full snapshot selection for reverse operations in accordance with aspects of the present disclosure.

FIG. 2 shows an example of a snapshot chain storage architecture 200 that supports full snapshot selection for reverse operations in accordance with aspects of the present disclosure. The snapshot chain storage architecture 200 may implement or be implemented by aspects of the computing environment 100 described with reference to FIG. 1. For example, the snapshot chain storage architecture 200 may include a computing device 215 and a DMS 210, which may represent examples of a computing device 115 and a DMS 110 as described with reference to FIG. 1. A client may access or communicate with the DMS 110 via the computing device 215 and a user interface. The DMS 210 may include a snapshot storage location (e.g., a database or cluster) that may store backups of client data from the computing device. In this example, the DMS may obtain and store one or more snapshot chains 220 that back up data for one or more disks 225 of the computing device 215.

The DMS 210 may manage backup and recovery of data for one or more computing devices 215 of one or more clients. The computing device 215 may include or be associated with various hardware components and corresponding computing resources, such as a VM 205, which may include one or more disks 225 (e.g., the disks 225-a and 225-b in this example). The DMS 210 may backup the computing device 215 by writing data that represents a version of the computing device 215 at a given point-in-time to the snapshot storage location of the DMS 210. The DMS 210 may obtain multiple backups of the computing device 215 over time, such that the client may recover the computing device 215 to any one of the multiple backed up versions. The DMS 210 may obtain and store backups of each disk 225 of the VM 205, or on some other level of granularity, such as per data block or per some other type of computing object.

To improve storage consumption as described herein, the DMS 210 may obtain snapshots of a computing object using incremental snapshot techniques. For example, the DMS 210 may obtain a first full snapshot 235 (e.g., the full snapshots 235-a and 235-d in FIG. 2) at a first point-in-time. The full snapshot 235 may also be referred to as a base snapshot in some examples herein. As described in further detail with reference to FIG. 1, a full snapshot 235 may represent the entirety of the state of the corresponding computing object as of the first time at which the full snapshot 235 is obtained. At subsequent times, when backing up the same device, the DMS 210 may obtain incremental snapshots 235. An incremental snapshot 235 may represent the changes to the state-which may be referred to as the delta—of the corresponding computing object that have occurred between an earlier or later point in time corresponding to another snapshot 235 (e.g., another full snapshot 235 or incremental snapshot 235) of the computing object and the incremental snapshot 235.

The DMS 210 may store the incremental snapshots 235 and full snapshots 235 for a computing object in the form of a snapshot chain 220. In the example of FIG. 2, the snapshot chain 220-a may be associated with (e.g., may represent or store data from) the disk 225-a and the snapshot chain 220-b may be associated with (e.g., may represent or store data from) the disk 225-b. A snapshot chain may include at least one full snapshot 235 and one or more incremental snapshots 235 that depend from the full snapshot 235. For example, the one or more incremental snapshots 235-b and 235-c may be obtained after the full snapshot 235-a in time and may include changes to the computing object that have occurred since the first time associated with the full snapshot 235-a. To recover a computing object to a given point in time, the DMS 210 may read the snapshot chain 220 and combine the incremental snapshot 235 associated with the requested recovery time with other incremental and full snapshots 235 from which the incremental snapshot 235 depends in the snapshot chain 220 to generate a version of the computing object at the requested recovery time. For example, to recover the disk 225-b at the third point in time, the DMS 210 may read the data in the snapshot 235-f, the data in the snapshot 235-e, and the data in the snapshot 235-d. The DMS 210 may combine the data to recover the version of the disks 225-b at the third time at which the snapshot 235-f was obtained.

In some examples, the snapshots 235 may be mapped to or stored as one or more patch files 230. For example, the DMS 210 may generate one or more patch files 230 for each snapshot 235. A patch file 230 may represent a sparse file stored in a file system, such as a distributed file system, that contains changes to be applied to another file or files. In some examples, a patch file 230 may be implemented as a key-value store. For example, a patch file 230 may store data partitions that have changed since a most recent snapshot 235 was obtained, as well as offsets to the data partitions. The snapshot chain 220-b may be stored as a set of patch files 230-a, 230-b, and 230-c in a distributed file system, for example. The patch file 230-b for the incremental snapshot 235-e may store one or more data partitions (e.g., a data block or portion of a data block of the disk 225-b) and offsets to each of the one or more data partitions in the patch file 230-*b*. Other data partitions in the patch file 230-*b* may be null (e.g., may include empty data sets).

In some examples, reversing an order of a snapshot chain 220 may be beneficial. For example, a reverse operation may reshuffle data between snapshots to make a latest or most recent snapshot 235 (e.g., backup) a full snapshot 235. Such reversing of a snapshot chain may increase recovery performance by allowing recovery of more recent snapshots 235 in the snapshot chain 220 using fewer read operations than if the snapshot chain 220 is not reversed.

The DMS 210 may execute a reverse operation periodically or based on one or more conditions. For example, if a length (e.g., a quantity of snapshots 235) of the snapshot chain 220 exceeds a threshold length (e.g., 64 snapshots 235, or some other threshold), the DMS 210 may initiate the reverse operation. Additionally, or alternatively, the DMS 210 may initiate the reverse operation based on a change rate associated with the snapshot chain 220 exceeding a threshold change rate (e.g., a 50 percent change rate, or some other threshold). The change rate may correspond to an amount of data that is changed between subsequent consecutive snapshots (e.g., a data change delta). The threshold length, the threshold change rate, or both may be configured by the DMS 210, the client, a system administrator, or any combination thereof.

In some examples, a client device, such as the computing device 215, may transmit a request to the DMS 210 to delete one or more snapshots 235. In response to the request, the DMS 210 may mark the one or more snapshots 235 for deletion and may delete (e.g., garbage collect) the one or more snapshots 235 during a next garbage collection operation. A snapshot 235 that is marked for deletion may be referred to as an expired snapshot in some examples herein. A client may request to delete a snapshot 235 (e.g., mark a snapshot 235 as expired) periodically, in some examples. For example, the client may store weekly snapshots, monthly snapshots, or snapshots 235 on some other periodic basis. If the DMS 210 obtains snapshots 235 more frequently, the client may request to delete remaining snapshots 235. Additionally, or alternatively, the client may monitor a length of the snapshot chains 220 and may request to delete one or more snapshots 235 to conserve storage space if the length is relatively long (e.g., greater than a threshold). In some examples, the client may request to delete snapshots 235 that were obtained before a given time (e.g., relatively old snapshots 235). The snapshots that are marked for deletion may be full snapshots 235, incremental snapshots 235, or both.

If one or more snapshots 235 in the snapshot chain 220 depend from the snapshot 235 that the client wishes to delete, the one or more dependent snapshots 235 may not be recoverable if the snapshot 235 is deleted or removed from the snapshot chain 220. Accordingly, the DMS 210 may perform a consolidation operation to consolidate the data in the expired snapshot 235 with data in a next unexpired snapshot 235 in the snapshot chain 220. For example, if the snapshot 235-*b* is expired (e.g., X2), the DMS 210 may consolidate the snapshot 235-*b* with the next unexpired snapshot in the snapshot chain 220-*a*, which may be the snapshot 235-*c* (e.g., X3). The DMS 210 may subsequently garbage collect the expired snapshot.

In some examples, the DMS 210 may perform consolidation and garbage collection inline as part of a reverse operation. The DMS 210 may refrain from or skip writing to any expired snapshots 235 during the reverse operation. For example, if the snapshot 235-*e* is expired, the DMS 210 may refrain from creating the corresponding patch file 230-*b* and may instead conditionally write data between the other snapshots 235 in the snapshot chain 220-*b* that are not expired. The DMS 210 may perform conditional writing to reverse the order of the snapshot chain 220 with reduced processing and complexity. In some examples, however, a most recent snapshot 235 in the snapshot chain 220 may be expired. For example, the DMS 210 may reduce a length, a size, or both of a snapshot chain 220 to be less than or equal to a threshold length, a threshold size, or both for the reverse operation. After the reduction, a most recent snapshot 235 in the reduced snapshot chain may be expired. In such cases, the DMS 210 may make the most recent snapshot 235 a new full snapshot 235 in the reverse operation, despite the most recent snapshot 235 being expired. That is, if the DMS 210 does not select a new full snapshot, the most recent snapshot 235 in the chain will be converted to a full snapshot, regardless of a status of the snapshot 235.

Techniques, systems, and devices described herein provide for the DMS 210 to determine whether a most recent snapshot 235 in a snapshot chain 220 is expired before performing a reverse operation. If the most recent snapshot 235 is marked for deletion, the DMS 210 may select a next most recent snapshot 235 in the snapshot chain 220 to be the new candidate full snapshot 235 for the reverse operation. The DMS 210 may thereby refrain from generating a new expired full snapshot, and may instead generate a new full snapshot that is not marked for deletion, which may improve processing efficiency and reduce resource consumption, among other examples.

Figure 3:
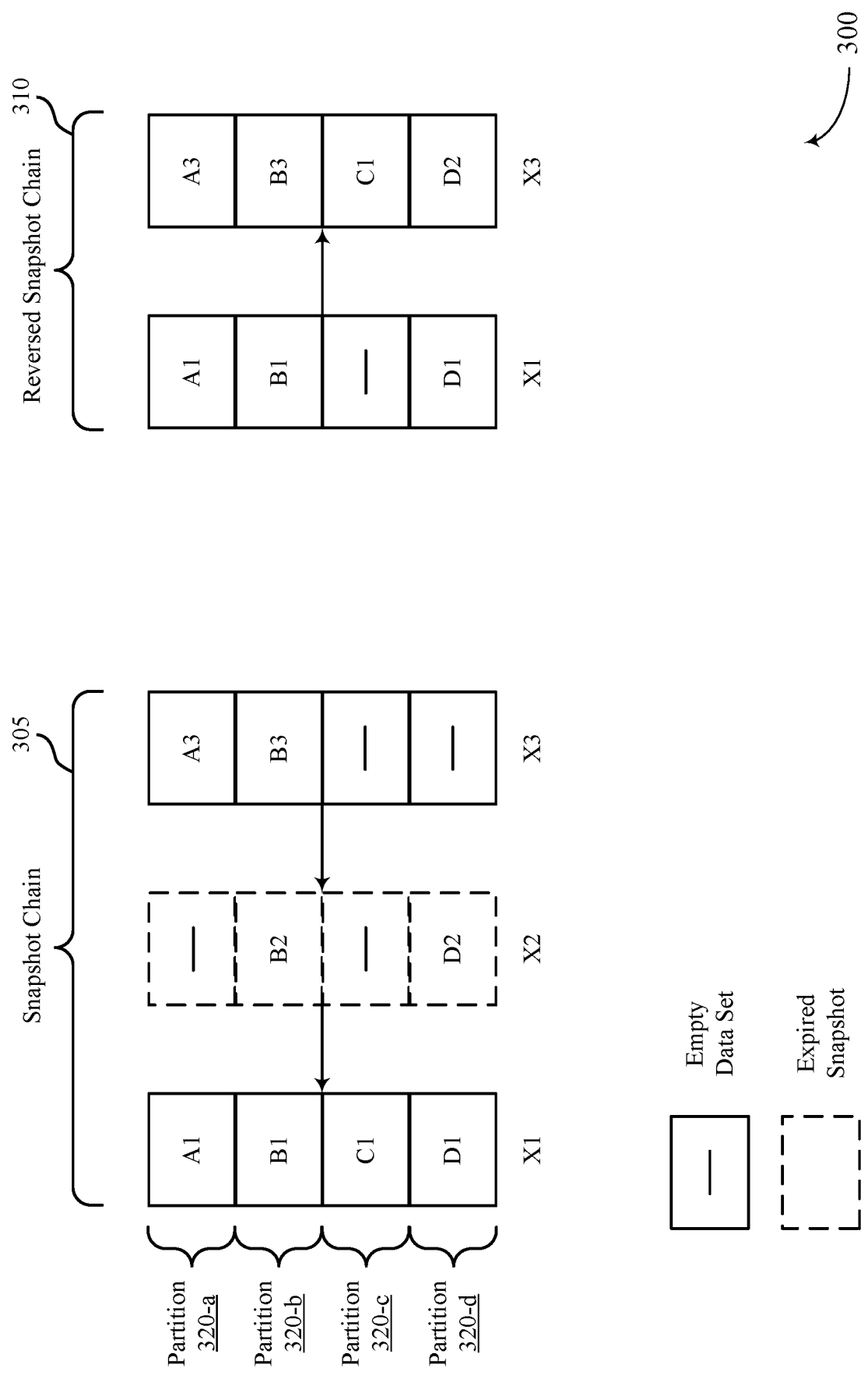
FIG. 3 shows an example of an inline reverse snapshot chain operation that supports full snapshot selection for reverse operations in accordance with aspects of the present disclosure.

FIG. 3 shows an example of an inline reverse snapshot chain operation 300 that supports full snapshot selection for reverse operations in accordance with aspects of the present disclosure. The inline reverse snapshot chain operation may implement or be implemented by aspects of the computing environment 100 and the snapshot chain storage architecture 200, as described with reference to FIGS. 1 and 2. For example, the inline reverse snapshot chain operation 300 illustrates a reverse operation for a snapshot chain that includes snapshots X1, X2, and X3, which may represent examples of the snapshots 135 and 235 described with reference to FIGS. 1 and 2.

In some examples, as illustrated in FIG. 2, the DMS may perform consolidation and garbage collection inline as part of a reverse operation. For example, the incremental snapshot X2 may be an expired snapshot, and the DMS may reverse the snapshot chain and garbage collect expired data as part of a same operation.

The snapshot chain 305 may represent an example of a snapshot chain before the reverse operation. For example, the snapshot chain 305 may include the snapshots X1, X2, and X3, which may be obtained by the DMS at first, second, and third times, respectively. The snapshots may represent data stored within one or more partitions 320 of a data block at the respective times. The snapshot chain 305 may include the full snapshot X1, which may include data stored in each partition of the data block at the first time (e.g., each of the partitions 320-*a*, 320-*b*, 320-*c*, and 320-*d*). The snapshots X2 and X3 may each be incremental snapshots that may be obtained at second and third times, respectively, that are after the first time. The partitions 320 may represent ranges of data addresses or other subsets of data within the data block.

The incremental snapshots X2 and X3 may store data that represents changes to one or more partitions 320 of the data block. For example, the incremental snapshot X2 may store data that represents changes to the partition 320-*b* since the first time and that represents changes to the partition 320-*d* since the first time. The snapshot X2 may store an empty data set (e.g., null data) for the other partitions 320-*a* and 320-*c* based on the data in these partitions 320 not having changed since the first time. The incremental snapshot X3 may similarly store data that represents changes to the partitions 320-*a* and 320-*b* since the first time. The snapshot X3 may store an empty data set (e.g., null data) for the other partitions 320-*c* and 320-*d* based on the data in these partitions 320 not having changed since the first time or the second time.

Although the snapshots are described as including data representative of a data block at different points in time, it is to be understood that the snapshots may back up data for any size or type of client data or other computing objects. For example, the snapshots may represent different versions of a VM or some other computing object. The partitions 320 may represent examples of subsets of information within the target object being backed up. For example, the partitions 320 may represent a range of bytes within a patch file block (e.g., 64 kilobytes), or some other unit of information.

The snapshots in the snapshot chain 305 may be forward incremental, as described with reference to FIGS. 1 and 2. That is, the snapshot X3 may depend from the snapshot X2, which may depend from the snapshot X1. In other words, the snapshot X3 may not be recoverable without accessing the snapshots X2 and X1, which were obtained before the snapshot X3. If the DMS receives a request to restore the data block to a version associated with the third time at which X3 was obtained, the DMS may restore the requested version of the data block by accessing each of X1, X2, and X3 to obtain the most recent data in the snapshot chain. In some cases (e.g., if the snapshot chain is relatively long), such access operations may be relatively complex and time consuming. As such, the DMS described herein may perform a reverse operation to reverse an order of the snapshot chain and convert the most recent (e.g., most recently obtained) incremental snapshot X3 in the snapshot chain 305 to a new full snapshot.

As described herein, the DMS may perform the inline reverse snapshot chain operation 300 to obtain the reversed snapshot chain 310 using a single operation. The inline reverse snapshot chain operation 300 may support execution of the consolidation and garbage collection operations inline with the reverse operation. That is, the DMS may execute the reversal, consolidation, and garbage collection of the snapshot chain 305 using a single operation (e.g., a single function or set of code rather than separate set of instructions in memory).

The DMS may perform the described inline reverse snapshot chain operation 300 by identifying most recent data for each partition 320 in the snapshot chain 305. The most recent data may correspond to a most recent backup of the respective partition. For example, the data A3 and the data B3 in the snapshot X3 may be the most recent data for the partitions 320-*a* and 320-*b*, respectively, because they may be included in the most recently obtained snapshot X3 in the snapshot chain 405. The data C1 in the snapshot X1 may be the most recent data for the partition 320-*c* because the more recent snapshots X2 and X3 may not include data for the partition 320-*c*. The data D2 in the snapshot X2 may be the most recent data for the partition 320-*d*.

The DMS may perform one or more write operations to conditionally write the most recent data to a next snapshot in the snapshot chain 305. That is, if there is a snapshot that was obtained more recently than the snapshot that includes the most recent data for a given partition 320 (e.g., and, by definition, includes an empty data set at the partition 320), the DMS may write the most recent data to the most recent snapshot if the most recent snapshot satisfies one or more conditions defined herein. The conditions may be that the snapshot is a most recent snapshot in the snapshot chain 305 that is not expired (e.g., not marked for deletion) and that the snapshot includes an empty data set for the respective partition. By performing such conditional writing, the DMS may move all of the most recent data forward in the snapshot chain 305 (e.g., reversing an order of the snapshot chain 305) and may refrain from writing to any expired incremental snapshot.

In the example of FIG. 3, the DMS may receive a request from a client to mark the incremental snapshot X2 for deletion. The snapshot X2 may thereby be expired. The DMS may refrain from writing to the snapshot X2 during the inline reverse snapshot chain operation 300 based on the snapshot X2 being expired and the conditional writing performed by the DMS. By skipping writing to any expired snapshots (e.g., that are not the new full snapshot), the DMS may refrain from generating a patch file for the expired snapshots, which may reduce processing and storage consumption. For example, if the client requests to delete a snapshot, patch file information for the snapshot may be empty, and the DMS may refrain from creating a patch file for that snapshot. A construct for writing data to patch files (e.g., the builder construct) may be created to write data to new patch files for all other snapshots that are not marked for deletion.

The conditional writing to reverse the order of the snapshot chain 305 may, in this example, include the DMS writing the data C1 from the snapshot X1 to the snapshot X3 based on the snapshot X3 being the most recently obtained snapshot in the snapshot chain 305 that includes an empty data set in the partition 320-*c* and that is not marked for deletion. The DMS may refrain from (e.g., skip) writing the data C1 to the snapshot X2 because the snapshot X2 may be marked for deletion. The writing may further include the DMS writing the data D2 from the snapshot X2 to the snapshot X3 based on the snapshot X2 including the most recent version of the partition 320-*d* and X3 being the most recently obtained snapshot in the snapshot chain 305 that includes an empty data set in the partition 320-*d* and that is not marked for expiration. That is, in some examples, data may be moved from a snapshot that is expired (e.g., marked for deletion) to another non-expired snapshot that is more recently obtained than the expired snapshot. Such writing from the expired snapshot may occur if the expired snapshot includes a most recent version of a given partition 320.

In this example, the DMS may skip writing A1 to the snapshot X2 because the snapshot X2 may be marked for deletion. Thus, because the other snapshots in the snapshot chain 305 that were obtained more recently than the snapshot X1 and are not marked for deletion already include data in the partition 320-*a* (e.g., the data A3), the DMS may maintain the data A1 in the snapshot X1.

After performing all of the conditional writing to reverse the order of the snapshot chain, the DMS may consolidate the data as part of the reverse operation. The consolidation operation may represent a task or function that is called inline by the reverse operation, such that the consolidation is performed before the reverse operation is complete. For example, the DMS may consolidate the data in the expired snapshot X2 with the data in the preceding snapshot X1. In this example, because the snapshot X1 already includes data in the partitions 320-*b* and 320-*d*, the DMS may not write any of the expired data to the snapshot X1. However, if, for example, the expired snapshot X2 included data (e.g., C2) in the partition 320-*c*, and the snapshot X1 included an empty data set after writing C1 to the snapshot X3, the DMS may consolidate the data C2 from the snapshot X2 to the snapshot X1.

After reversing the order and consolidating the data, the DMS may perform inline garbage collection as part of the reverse operation. The garbage collection operation may represent a task or function that is called inline by the reverse operation, such that the garbage collection is performed before the reverse operation is complete. For example, the DMS may delete any expired snapshots, such as the snapshot X2. The DMS may delete all data that is stored in the snapshots that are marked for deletion. In some examples, some expired data may be moved to a most recent snapshot (e.g., D2 in this example) or consolidated with a prior snapshot, and the DMS may delete all remaining data that is stored in the expired snapshot after the writing and consolidating. Additionally, or alternatively, if no data was moved from the expired snapshot during the writing portions of the reverse operation, the DMS may delete, as part of the deleting the expired snapshot, all of the data that was included in the snapshot at the time the user marked the snapshot for deletion. The consolidation and garbage collection performed inline as part of the reverse operation may provide for relatively quick space reclamation. For example, without inline operations, the space may be reclaimed after a next consolidation job and garbage collection job are performed, which may occur a relatively long time period after the reverse operation.

After performing the reverse operation with inline consolidation and garbage collection, the DMS may store the reversed snapshot chain 310. The reversed snapshot chain 310 may include reverse incremental snapshots, as described with reference to FIGS. 1 and 2. That is, the snapshot X1 may depend from the snapshot X3. The DMS may thereby recover the data block to the third point in time version associated with the third time at which the snapshot X3 was obtained by accessing the snapshot X3 directly, which may improve efficiency and reduce processing as compared with accessing the snapshots X3, X2, and X1 to recover to the third time, as would be done using the snapshot chain 305 before the reverse operation. To recover the snapshot X1, the DMS may access the snapshots X3 and X1. If a snapshot chain is relatively long, the reverse operation may provide for more recent versions of a data block to be recovered faster than if the snapshot chain were not reversed.

In some cases, the DMS may convert a most recent snapshot in the snapshot chain 305 to a new full snapshot as part of the reverse operation, regardless of whether the most recent snapshot is expired. For example, the DMS may fill each partition 320 of the most recent snapshot with the most recent data, and the DMS may conditionally write to remaining snapshots in the snapshot chain 305. However, if the most recent snapshot is expired, the reverse operation may be associated with relatively high processing and resource consumption.

Techniques described herein provide for the DMS to determine whether a most recent snapshot in a snapshot chain 305 is expired, and select a next most recent unexpired snapshot to be a new full snapshot if the most recent snapshot is expired. The DMS may still perform inline garbage collection and consolidation as part of the reverse operation after selecting the new full snapshot. Techniques for selecting a candidate full snapshot are described in further detail elsewhere herein, including with reference to FIGS. 4A and 4B.

Figure 4A:
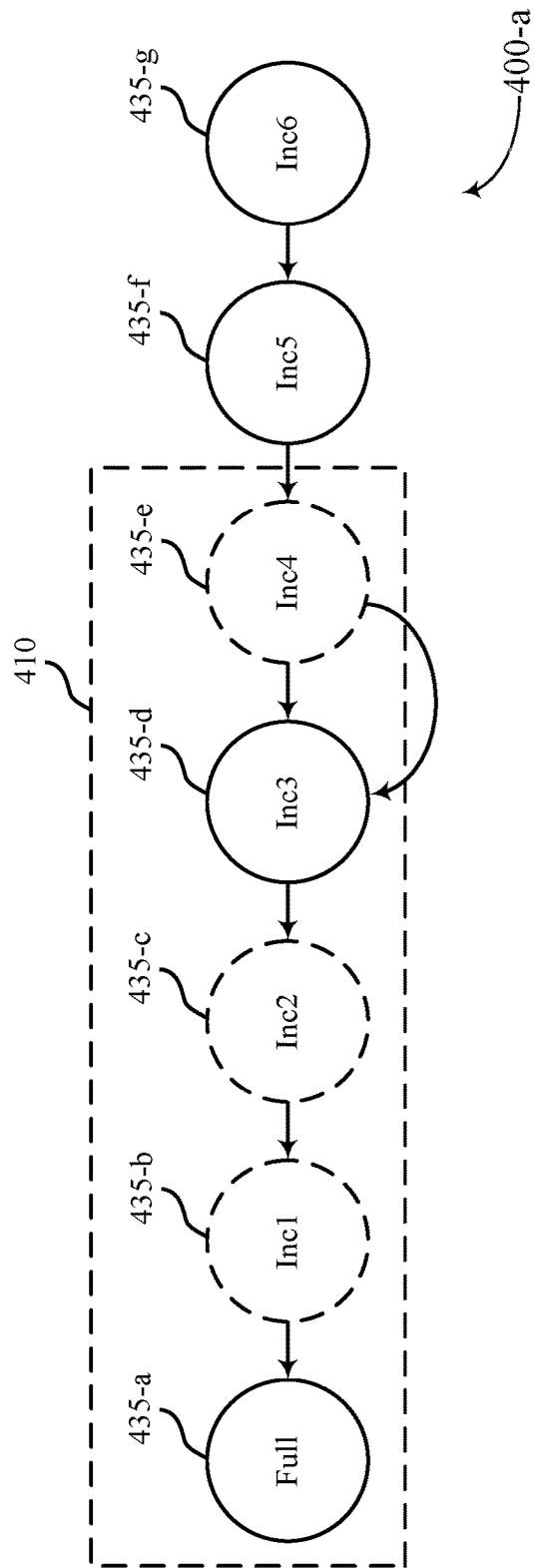
FIGS. 4A and 4B shows examples of operations within a full snapshot selection and reverse operation that support full snapshot selection for reverse operations in accordance with aspects of the present disclosure.
Figure 4B:
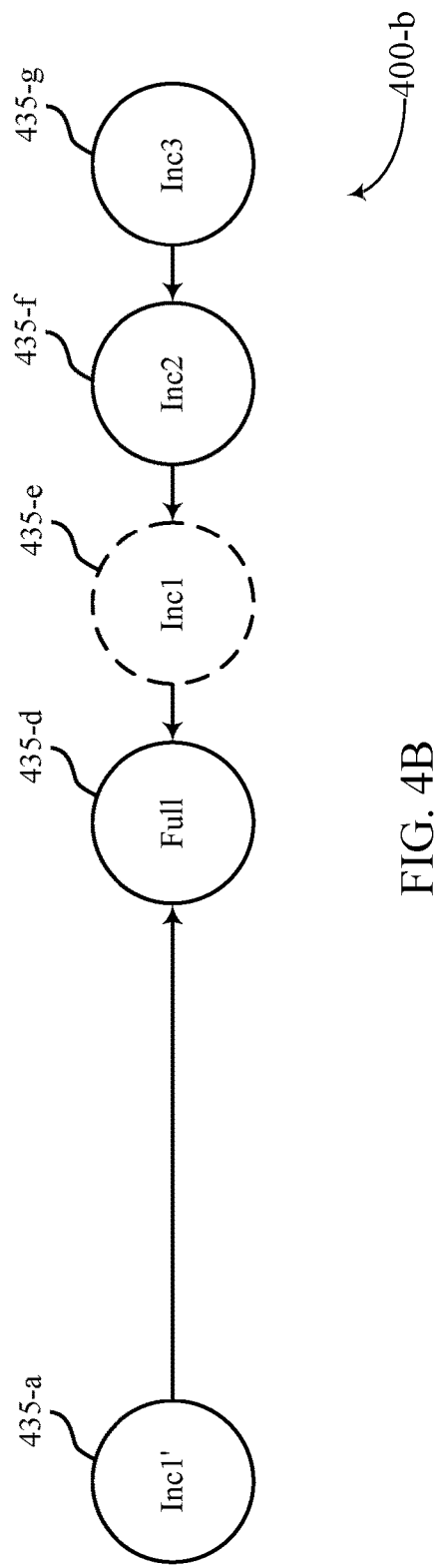

FIGS. 4A and 4B show examples of operations 400-*a* and 400-*b* within a full snapshot selection and reverse operation that support full snapshot selection for reverse operations in accordance with aspects of the present disclosure. The full snapshot selection and reverse operation may implement or be implemented by aspects of the computing environment 100 and the snapshot chain storage architecture 200, as described with reference to FIGS. 1 and 2. For example, the full snapshot selection and reverse operation illustrates a snapshot chain that may include one or more full snapshots, one or more incremental snapshots 435, or both, which may represent examples of the snapshots 135 and 235, as described with reference to FIGS. 1 and 2.

FIG. 4A illustrates a first example operation 400-*a* of the full snapshot selection and reverse operation described herein. FIG. 4A illustrates a snapshot chain including a first full snapshot 435-*a* and six incremental snapshots 435-*b*, 435-*c*, 435-*d*, 435-*e*. 435-*f*, and 435-*g*, which depend from the full snapshot 435-*a* in the snapshot chain. The snapshots 435 may each be obtained by the DMS at respective times, with the full snapshot 435-*a* being an oldest snapshot obtained at a first time, and the incremental snapshot 435-*g* being a most recent snapshot obtained at a most recent point-in-time. Although not illustrated, it is to be understood that each of the snapshots 435 may represent data stored within one or more partitions of a data block at the respective times, as described in further detail elsewhere herein, including with reference to FIG. 3.

The snapshots 435 in the snapshot chain may be forward incremental, as described with reference to FIGS. 1-3. In other words, the snapshot 435-*g* may not be recoverable without accessing each of the other snapshots 435, which were obtained before the snapshot 435-*g*. If the DMS receives a request to restore the data block to a version associated with the time at which the snapshot 435-*g* was obtained, the DMS may restore the requested version of the data block by accessing each of the remaining snapshots 435 in the chain to obtain the most recent data in the snapshot chain. In some cases (e.g., if the snapshot chain is relatively long), such access operations may be relatively complex and time consuming. As such, the DMS described herein may perform a reverse operation to reverse an order of the snapshot chain and convert the most recent (e.g., most recently obtained) incremental snapshot 435-*g* in the snapshot chain to a new full snapshot.

In some examples, however, the DMS may support reverse operations for up to a threshold amount of data. That is, the DMS may determine whether a size of the snapshot chain exceeds a threshold size, whether a length of the snapshot chain exceeds a threshold length, or both before performing the reverse operation. The size of the snapshot chain may refer to an amount of data stored within the snapshot chain (e.g., a total sum of all data stored across all of the snapshots in the snapshot chain in bytes, or some other unit of data measurement). The length of the snapshot chain may refer to a quantity of snapshots 435 included in the snapshot chain. For example, the snapshot chain illustrated in FIG. 4A may have a length of seven because the snapshot chain includes seven snapshots 435-*a* through 435-*g*.

If the snapshot chain exceeds the threshold length and/or the threshold size, the DMS may reduce a length and/or size of the snapshot chain prior to reversing the snapshot chain. In the example of FIG. 4A, the threshold length may be five, and the DMS may "cap" the snapshot chain to the length of five before performing the reverse operation. Additionally, or alternatively, the threshold size may be associated with an amount of data that is greater than or equal to all of the data included in snapshots 435-*a* through 435-*e*, but may be less than the total amount of data included in snapshots 435-*a* through 435-*f*. As such, the DMS may cap the snapshot chain at the snapshot 435-*e*. The reduced snapshot chain 410 is shown with dashed lines in FIG. 4A. The reduced snapshot chain 410 may include the full snapshot 435-*a* and one or more incremental snapshots 435.

The DMS may perform the reverse operation after generating the reduced snapshot chain 410. The reverse operation may be performed only on the snapshots 435 in the reduced snapshot chain 410 and may not include the snapshots 435-*f* and 435-*g* that were capped. As such, the snapshot 435-*e* may be a most recent snapshot 435 in the reduced snapshot chain 410 for the purposes of the reverse operation. In some cases, the DMS may thereby make the snapshot 435-*e* a new full snapshot, and the DMS may fill the snapshot 435-*e* with the most recent data in the reduced snapshot chain 410.

However, in this example, the snapshots 435-*b*, 435-*c*, and 435-*e* may be expired. Thus, if the DMS converts the most recent snapshot in the reduced snapshot chain 410 to a new full snapshot, the new full snapshot may be an expired snapshot that may be marked for deletion. For example, the DMS may garbage collect and/or consolidate the snapshots 435-*b* and 435-*c* inline as part of the reverse operation, but the DMS may refrain from garbage collecting the snapshot 435-*e*, as the snapshot 435-*e* is the new full. The resulting reversed snapshot chain in such cases may be a first incremental snapshot associated with the snapshot 435-*a*, a second incremental snapshot associated with the snapshot 435-*d*, and the new full snapshot 435-*e*, which may include at least some expired data and may be marked for deletion. The snapshots 435-*a* and 435-*d* may depend from the new full snapshot 435-*e* in a reverse incremental dependency chain. The snapshots 435-*f* and 435-*g* may also depend from the new full snapshot 435-*e* (e.g., forward incremental dependencies).

Consolidation operations performed after the reverse operation may not run on full snapshots. As such, the new full snapshot 435-*e* may remain in the system for a relatively long period of time, which may reduce efficiency of space usage and I/O resource usage. Techniques described herein provide for the DMS to improve storage and I/O efficiency by selecting a different snapshot to use as the new full snapshot for a reverse operation if a most recent snapshot in a chain is expired.

FIG. 4B illustrates a second example operation 400-*b* of the full snapshot selection and reverse operation described herein. FIG. 4B illustrates the snapshot chain after a reverse operation is performed in accordance with the techniques described herein.

The DMS may reverse the reduced snapshot chain 410 illustrated in FIG. 4A. In this example, the DMS may identify that the most recent snapshot 435-*e* in the reduced snapshot chain 410 is expired. The DMS may select, based on identifying that the most recent snapshot 435-*e* is expired, a different snapshot 435 in the reduced snapshot chain 410 to be a new full snapshot for the reverse operation. The DMS may select the new full snapshot based on the candidate snapshot being a most recently obtained incremental snapshot in the reduced snapshot chain 410 that has not been marked for deletion. In this example, the snapshots 435-*e*, 435-*c*, and 435-*b* may be marked for deletion. Accordingly, snapshot 435-*d* may be a most recently obtained incremental snapshot in the reduced snapshot chain 410 that is not marked for deletion. The DMS may select the snapshot 435-*d* to be the new full snapshot.

The DMS may perform the reverse operation to reverse an order of the reduced snapshot chain 410 and make the snapshot 435-*d* the new full snapshot. FIG. 4B illustrates an example result of the reverse operation.

The DMS may perform the reverse operation by writing the most recent data for each partition of the data block forward to more recent snapshots that have available space in the corresponding partition. As such, the new full snapshot 435-*d* may be filled with the most recently obtained data for each partition of the data block, and the snapshot 435-*a*, which used to be the full snapshot, may become an incremental snapshot that includes older versions of data of one or more of the partitions. The DMS may, in some examples, perform inline consolidation and garbage collection as part of the reverse operation, such that the snapshots 435-*b* and 435-*c* may be deleted and the corresponding data deleted and/or consolidated, as described with reference to FIG. 3.

The snapshot 435-*e* may not be included in the reverse operation because the snapshot 435-*e* was marked for deletion and the DMS selected the snapshot 435-*d* to be the new full snapshot. The reversed snapshot chain may thereby include an incremental snapshot corresponding to snapshot 435-*a* and the new full snapshot 435-*d*. The snapshot 435-*a* may depend from the new full snapshot 435-*d* in the reverse incremental chain. Thus, the snapshot 435-*e* may not be modified during the reverse operation, and the snapshots 435-*e*, 435-*f*, and 435-*g* may remain as incremental snapshots that depend from the new full snapshot 435-*d* in a forward incremental chain.

After the reverse operation, the remaining expired snapshots, such as the snapshot 435-*e*, may be garbage collected by a subsequent consolidation operation or another reverse operation. Thus, the snapshot 435-*e* may be deleted relatively quickly. By refraining from using the snapshot 435-*e* as the new full snapshot, the DMS may improve storage capacity and reduce I/O operations as compared with systems that may automatically select the most recent snapshot 435-*e* to be the new full snapshot, regardless of a status of the snapshot.

The DMS as described herein may thereby ensure that the most recent unexpired snapshot 435 in a reduced snapshot chain 410 after capping a snapshot chain is acting as a new full snapshot for a reverse operation. The DMS may ensure that the new full snapshot will not include any unreachable (e.g., expired) data that may result in space reclamation. The DMS may consolidate any expired snapshots left within the reduced snapshot chain 410 during the reverse operation, and unreached data blocks (e.g., expired data that cannot be consolidated) may be garbage collected inline as part of the reverse operation. By ensuring that no expired snapshot is converted to a full snapshot after a reverse operation, the DMS may increase efficiency associated with snapshot storage and management at least because consolidation may not run on full snapshots. Additionally, or alternatively, by ensuring that no expired snapshot is converted to a full snapshot after a reverse operation, the DMS may increase I/O resource efficiency to generate unexpired full snapshots that may remain in the system for relatively long periods of time.

Figure 5:
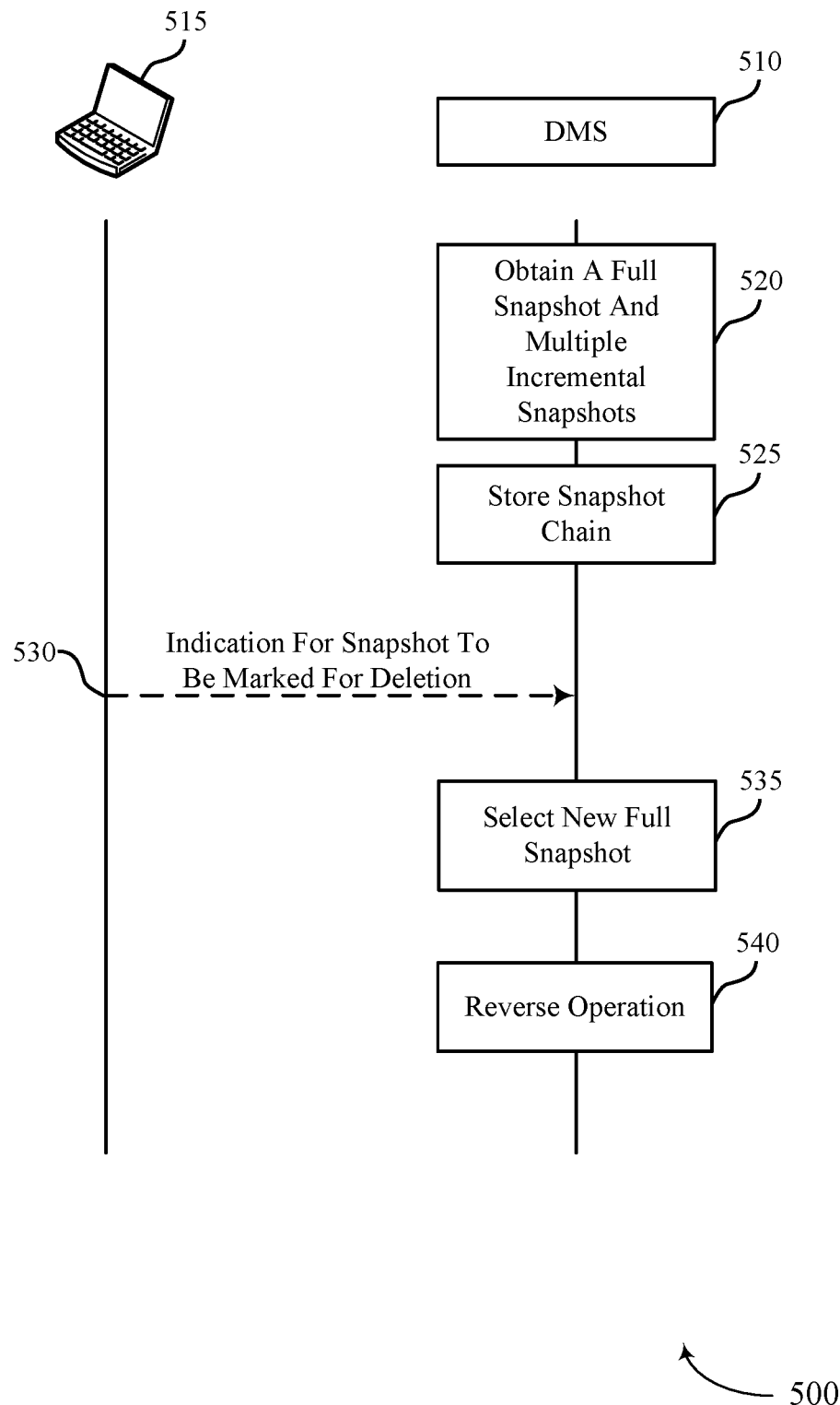
FIG. 5 shows an example of a process flow that supports full snapshot selection for reverse operations in accordance with aspects of the present disclosure.

FIG. 5 shows an example of a process flow 500 that supports full snapshot selection for reverse operations in accordance with aspects of the present disclosure. The process flow 500 may implement or be implemented by aspects of FIGS. 1-4. For example, the process flow 500 may be implemented by DMS 510 and a computing device 515, which may represent examples of a corresponding DMS and computing device as described with reference to FIGS. 1-4.

In this example, the DMS 510 may select a candidate snapshot to be a full snapshot for a reverse operation. The DMS 510 may select the candidate snapshot based on one or more conditions to reduce I/O resources and processing, improve storage availability, and improve efficiency associated with recovery of data for the computing device 515.

In some aspects, the operations illustrated in the process flow 500 may be performed by hardware (e.g., including circuitry, processing blocks, logic components, and other components), code (e.g., software or firmware) executed by a processor, or any combination thereof. For example, aspects of the process flow 500 may be implemented or managed by a DMS 510, a reverse operation manager, or some other software or application that is associated with data backup and recovery.

At 520, the DMS 510 may obtain a full snapshot of a data block and one or more incremental snapshots of the data block. The incremental snapshots may each include data associated with changes to partitions (e.g., portions) of the data block since the full snapshot. Although illustrated as a single step in FIG. 5, it is to be understood that the DMS 510 may obtain the full snapshot at a first time, and may obtain each incremental snapshot at a respective second time that is after the first time. The full snapshot and incremental snapshots may represent examples of corresponding snapshots as described with reference to FIGS. 1-4.

At 525, in some examples, the DMS 510 may store the full snapshot and the incremental snapshots as a snapshot chain. The DMS 510 may store the snapshot chain in a cloud environment, database, or other storage location associated with the DMS 510. In some examples, the snapshot chain may be stored as a series of patch files in a distributed file system, or in some other format, as described with reference to FIG. 2. The incremental snapshots may each depend from the full snapshot in the snapshot chain. In some examples, the DMS 510 may store the full snapshot first after obtaining the full snapshot and may subsequently store each incremental snapshot as the incremental snapshots are obtained.

At 530, the DMS may receive, from the computing device 515 (e.g., from a user or client via a user interface), a request to mark at least one snapshot in the snapshot chain for deletion. The user may request to delete the full snapshot, an incremental snapshot, or any combination thereof. The user may request to delete the snapshots periodically or based on one or more scenarios or parameters associated with the user data. The DMS 510 may mark the indicated snapshot(s) for deletion. As such, the snapshot(s) may be referred to as expired snapshots, and may be deleted in a subsequent reverse operation or garbage collection operation performed by the DMS 510.

At 535, the DMS 510 may select a new full snapshot for a reverse operation. The DMS 510 may determine that a reverse operation is to be performed to reverse an order of the snapshot chain and to convert an incremental snapshot to a new full snapshot. The DMS 510 may determine to perform the reverse operation based on one or more conditions or thresholds being satisfied, as described with reference to FIG. 2. For example, the DMS 510 may perform the reverse operation based on a change rate associated with the snapshot chain exceeding a threshold, based on a length of the snapshot chain exceeding the threshold, based on one or more triggers, or any combination thereof.

In some examples, the snapshot chain to be reversed may exceed one or more thresholds for the reverse operation. For example, a size of the snapshot chain may exceed a threshold size, or a length of the snapshot chain may exceed a threshold length, or both. In such cases, the DMS 510 may perform a snapshot chain truncation to remove one or more incremental snapshots from the snapshot chain prior to performing the reverse operation. The snapshot chain truncation may include removing the one or more most recently obtained snapshots from the snapshot chain to ensure that an amount of data included in the truncated (e.g., reduced) snapshot chain, a quantity of snapshots included in the truncated (e.g., reduced) snapshot chain, or both are less than respective thresholds, as described with reference to FIG. 4A.

In some examples, after the snapshot chain truncation, a most recently obtained incremental snapshot in the truncated snapshot chain (e.g., an incremental snapshot that was obtained more recently than other snapshots in the truncated snapshot chain) may be, in some examples, an expired snapshot. For example, the truncated snapshot chain may not include one or more of the incremental snapshots obtained most recently by the DMS 510 due to the snapshot chain truncation. Accordingly, the most recent incremental snapshot in the truncated snapshot chain may have been obtained by the DMS 510 some time period before the reverse operation, and may have been marked for deletion or otherwise expired within that time period. Additionally, or alternatively, in some examples, the DMS 510 may not truncate the snapshot chain, and a most recently obtained incremental snapshot may still be an expired snapshot.

As described herein, the DMS 510 may, at 535, select a new snapshot to be the full snapshot for the reverse operation based on the most recent incremental snapshot in the snapshot chain (e.g., after truncation) being expired. The DMS 510 may instead select a next most recent incremental snapshot in the truncated snapshot chain that is not marked for deletion.

At 540, the DMS 510 may perform the reverse operation to reverse an order of the snapshot chain (e.g., the truncated snapshot chain) to convert the selected incremental snapshot to the new full snapshot. The reverse operation may include the DMS 510 writing, for each partition of the data block, data associated with the partition from a snapshot that includes a most recent version of the data to a second snapshot that is not expired and that is a most recent snapshot in the snapshot chain that includes an empty data set in the corresponding partition. The DMS 510 may thereby write the most recent data for each partition to the new full snapshot, and the DMS 510 may move other more recent data forward in the snapshot chain. The DMS 510 may, in some examples, perform consolidation and garbage collection inline as part of the reverse operation to garbage collect any expired and unreachable data in the snapshot chain. The snapshot chain after reverse may thereby include one or more incremental snapshots and the new full snapshot, which may be the most recently obtained snapshot (e.g., the snapshot associated with a most recent point-in-time).

In some examples, after performing the reverse operation, the DMS 510 may delete or otherwise consolidate the most recent incremental snapshot that is expired based on the snapshot depending from the new full snapshot in the snapshot chain after the reverse operation (e.g., the snapshot that is obtained after the new full snapshot). The DMS 510 may thereby improve storage capacity by refraining from converting an expired snapshot to a full snapshot during a reverse operation.

Figure 6:
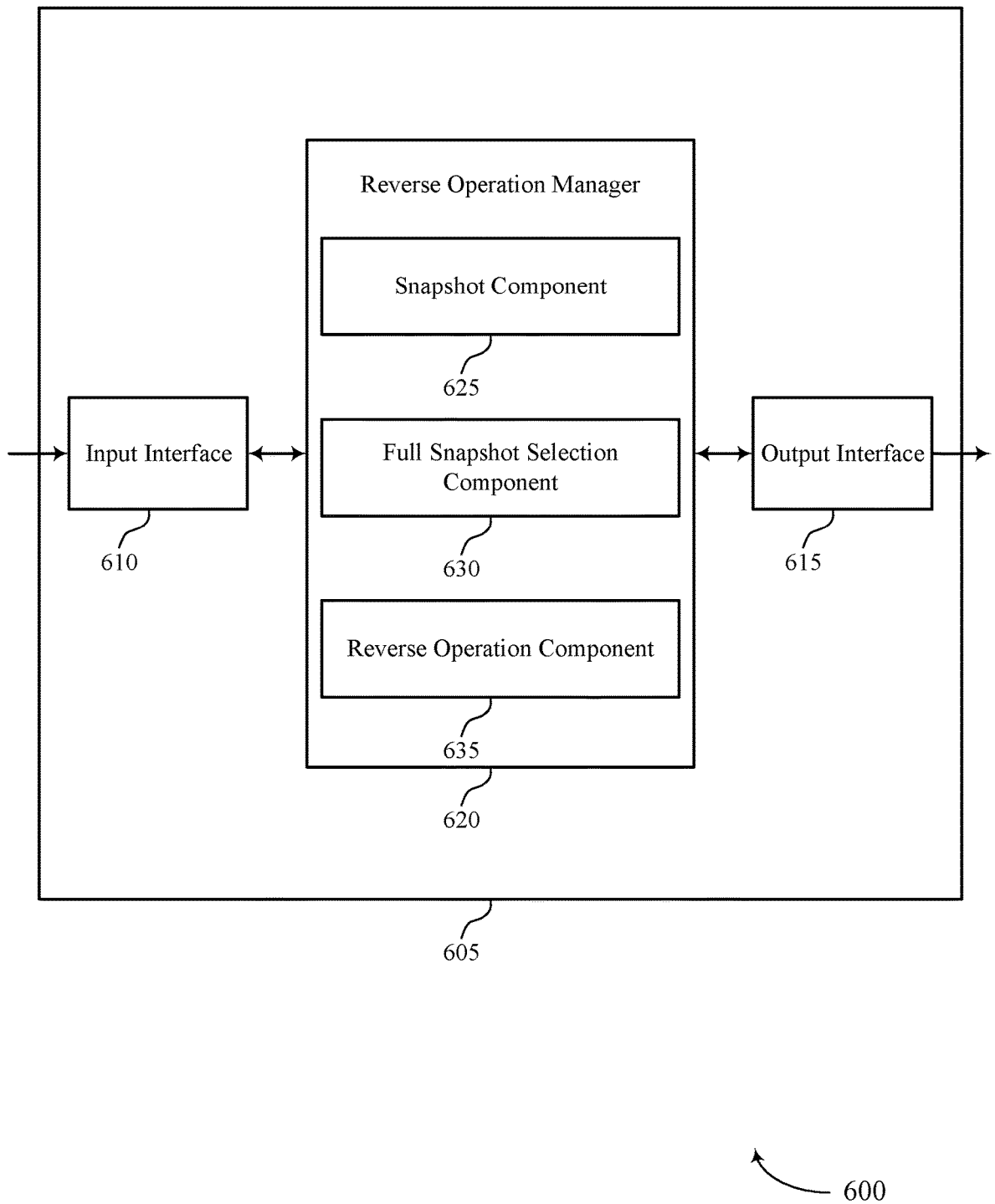
FIG. 6 shows a block diagram of an apparatus that supports full snapshot selection for reverse operations in accordance with aspects of the present disclosure.

FIG. 6 shows a block diagram 600 of a system 605 that supports full snapshot selection for reverse operations in accordance with aspects of the present disclosure. In some examples, the system 605 may be an example of aspects of one or more components described with reference to FIG. 1, such as a DMS 110. The system 605 may include an input interface 610, an output interface 615, and a reverse operation manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the reverse operation manager 620 to support full snapshot selection for reverse operations. In some cases, the input interface 610 may be a component of a network interface 825 as described with reference to FIG. 8.

The output interface 615 may manage output signaling for the system 605. For example, the output interface 615 may receive signaling from other components of the system 605, such as the reverse operation manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the reverse operation manager 620 may include a snapshot component 625, a full snapshot selection component 630, a reverse operation component 635, or any combination thereof. In some examples, the reverse operation manager 620, or various components thereof, may be configured to perform various operations (e.g., receiving, monitoring, transmitting) using or otherwise in cooperation with the input interface 610, the output interface 615, or both. For example, the reverse operation manager 620 may receive information from the input interface 610, send information to the output interface 615, or be integrated in combination with the input interface 610, the output interface 615, or both to receive information, transmit information, or perform various other operations as described herein.

The snapshot component 625 may be configured as or otherwise support a means for obtaining a full snapshot of a data block and a set of multiple incremental snapshots that include data associated with changes to partitions of the data block since the full snapshot, where the full snapshot and the set of multiple incremental snapshots are stored as a snapshot chain. The full snapshot selection component 630 may be configured as or otherwise support a means for selecting, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion. The reverse operation component 635 may be configured as or otherwise support a means for performing the reverse operation to reverse an order of the snapshot chain to convert the incremental snapshot to the new full snapshot.

Figure 7:
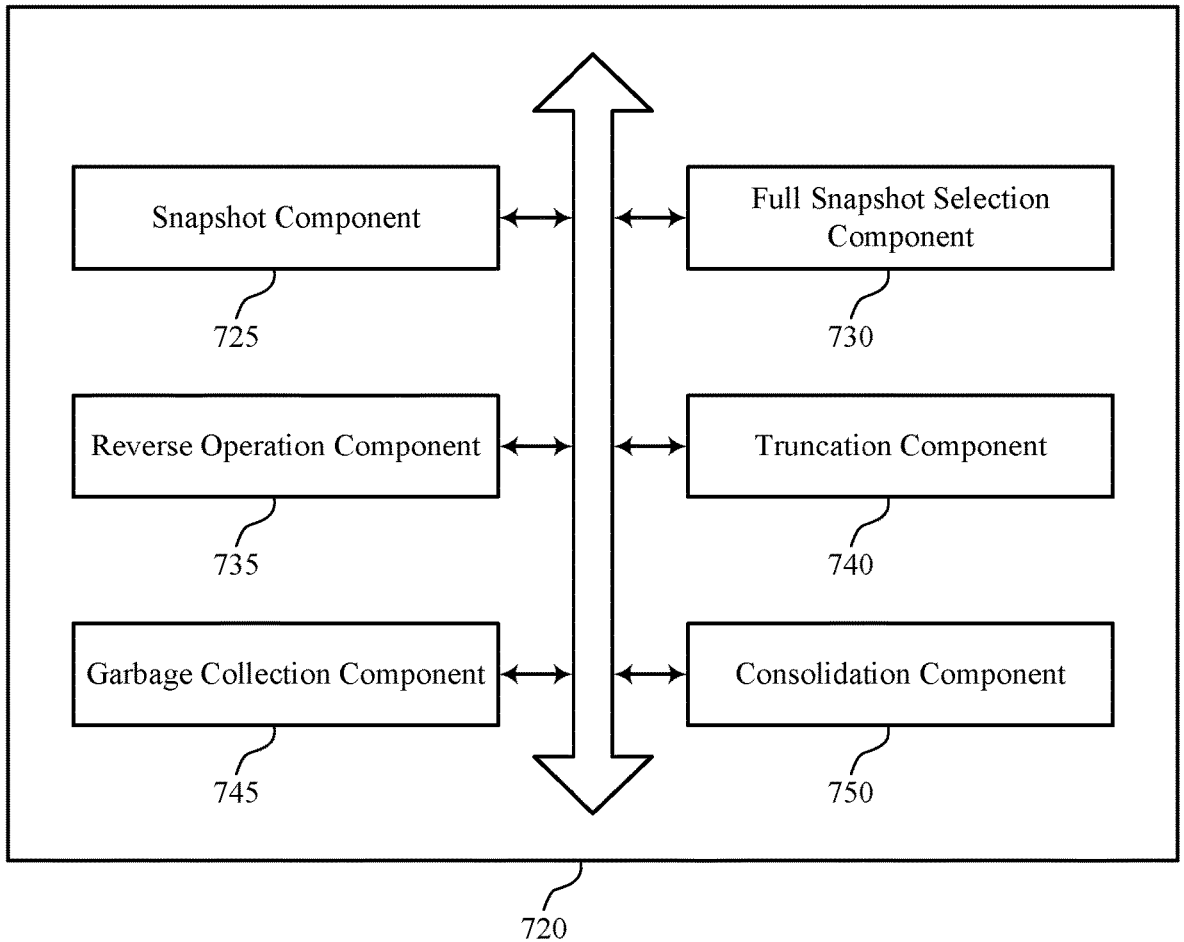
FIG. 7 shows a block diagram of a reverse operation manager that supports full snapshot selection for reverse operations in accordance with aspects of the present disclosure.

FIG. 7 shows a block diagram 700 of a reverse operation manager 720 that supports full snapshot selection for reverse operations in accordance with aspects of the present disclosure. The reverse operation manager 720 may be an example of aspects of a reverse operation manager or a reverse operation manager 620, or both, as described herein. The reverse operation manager 720, or various components thereof, may be an example of means for performing various aspects of full snapshot selection for reverse operations as described herein. For example, the reverse operation manager 720 may include a snapshot component 725, a full snapshot selection component 730, a reverse operation component 735, a truncation component 740, a garbage collection component 745, a consolidation component 750, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot component 725 may be configured as or otherwise support a means for obtaining a full snapshot of a data block and a set of multiple incremental snapshots that include data associated with changes to partitions of the data block since the full snapshot, where the full snapshot and the set of multiple incremental snapshots are stored as a snapshot chain. The full snapshot selection component 730 may be configured as or otherwise support a means for selecting, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion. The reverse operation component 735 may be configured as or otherwise support a means for performing the reverse operation to reverse an order of the snapshot chain to convert the incremental snapshot to the new full snapshot.

In some examples, the truncation component 740 may be configured as or otherwise support a means for performing a snapshot chain truncation to remove, from among the set of multiple incremental snapshots, one or more incremental snapshots from the snapshot chain prior to performing the reverse operation, where the most recent incremental snapshot in the snapshot chain is a most recent snapshot in the snapshot chain after the snapshot chain truncation.

In some examples, to support performing the snapshot chain truncation, the truncation component 740 may be configured as or otherwise support a means for performing the snapshot chain truncation based on a size of the snapshot chain being greater than a threshold size associated with the reverse operation, the threshold size corresponding to a threshold amount of data stored in the snapshot chain, where a second size of the snapshot chain after the snapshot chain truncation is less than or equal to the threshold size.

In some examples, to support performing the snapshot chain truncation, the truncation component 740 may be configured as or otherwise support a means for performing the snapshot chain truncation based on a length of the snapshot chain being greater than a threshold length associated with the reverse operation, the threshold length corresponding to a threshold quantity of snapshots included in the snapshot chain, where a second length of the snapshot chain after the snapshot chain truncation is less than or equal to the threshold length.

In some examples, the garbage collection component 745 may be configured as or otherwise support a means for deleting, after performing the reverse operation, the most recent incremental snapshot that is marked for deletion, where deleting the most recent incremental snapshot is based on the most recent incremental snapshot depending from the new full snapshot in the snapshot chain after the reverse operation.

In some examples, the consolidation component 750 may be configured as or otherwise support a means for consolidating, after performing the reverse operation, expired data in the most recent incremental snapshot that is marked for deletion with second data in a second incremental snapshot that is obtained after the most recent incremental snapshot, where consolidating the expired data is based on the most recent incremental snapshot depending from the new full snapshot in the snapshot chain after the reverse operation. In some examples, the garbage collection component 745 may be configured as or otherwise support a means for deleting the expired data that remains in the most recent incremental snapshot after consolidating the expired data with the second data in the second incremental snapshot.

In some examples, to support consolidating the expired data, the consolidation component 750) may be configured as or otherwise support a means for writing, for a partition of the partitions of the data block, the expired data that is in the partition from the most recent incremental snapshot to the second incremental snapshot based on the second data in the second incremental snapshot including an empty data set in the partition. In some examples, to support consolidating the expired data, the consolidation component 750 may be configured as or otherwise support a means for skipping writing, for the partition of the partitions of the data block, the expired data that is in the partition from the most recent incremental snapshot to the second incremental snapshot based on the second data in the second incremental snapshot including data in the partition.

In some examples, to support performing the reverse operation, the reverse operation component 735 may be configured as or otherwise support a means for writing, for a first partition from among the partitions of the data block, data associated with the first partition from a first snapshot in the snapshot chain that includes a most recent version of the data in the first partition to a second snapshot, where writing to the second snapshot is based on the second snapshot satisfying a set of conditions, and where the set of conditions include the second snapshot being a most recent snapshot in the snapshot chain that has an empty data set in the first partition and the second snapshot not being marked for deletion. In some examples, to support performing the reverse operation, the garbage collection component 745 may be configured as or otherwise support a means for deleting, as part of the reverse operation and after writing the data, one or more snapshots in the snapshot chain based on the one or more snapshots being marked for deletion.

In some examples, the garbage collection component 745 may be configured as or otherwise support a means for receiving an indication that one or more snapshots of the snapshot chain are marked for deletion by a user, the one or more snapshots including at least the most recent incremental snapshot.

In some examples, subsequent to completion of the reverse operation, the incremental snapshot is converted to the new full snapshot based on the new full snapshot including a most recent version of the data in all of the partitions of the data block.

Figure 8:
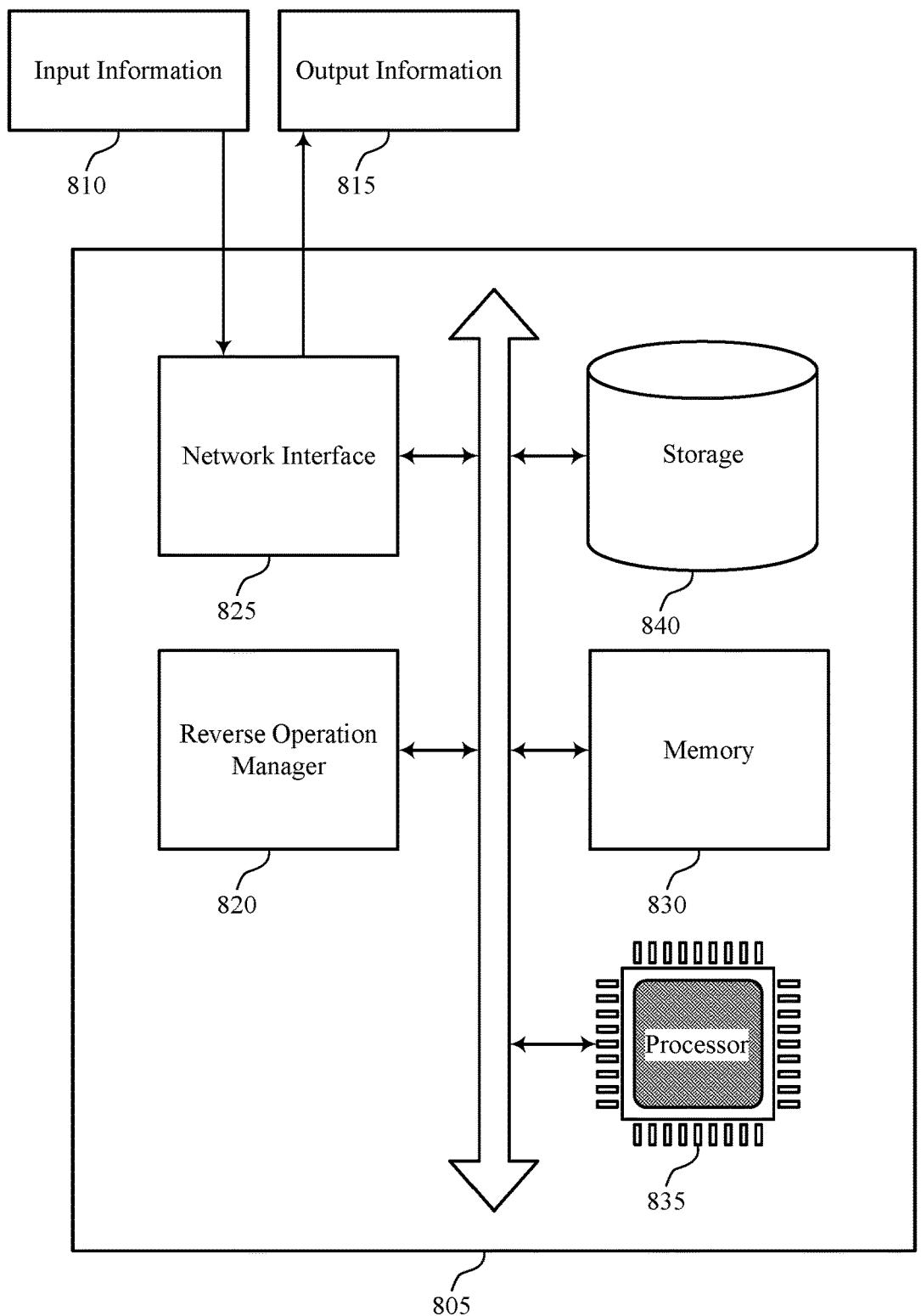
FIG. 8 shows a diagram of a system including a device that supports full snapshot selection for reverse operations in accordance with aspects of the present disclosure.

FIG. 8 shows a block diagram 800 of a system 805 that supports full snapshot selection for reverse operations in accordance with aspects of the present disclosure. The system 805 may be an example of or include the components of a system 605 as described herein. The system 805 may include components for data management, including components such as a reverse operation manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically: via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting full snapshot selection for reverse operations). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840) may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840) may be an example of one or more components described with reference to FIG. 1, such as one or more network disks 180.

For example, the reverse operation manager 820 may be configured as or otherwise support a means for obtaining a full snapshot of a data block and a set of multiple incremental snapshots that include data associated with changes to partitions of the data block since the full snapshot, where the full snapshot and the set of multiple incremental snapshots are stored as a snapshot chain. The reverse operation manager 820 may be configured as or otherwise support a means for selecting, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion. The reverse operation manager 820 may be configured as or otherwise support a means for performing the reverse operation to reverse an order of the snapshot chain to convert the incremental snapshot to the new full snapshot.

By including or configuring the reverse operation manager 820 in accordance with examples as described herein, the system 805 may support techniques for full snapshot selection for reverse operations, which may provide one or more benefits such as, for example, more efficient utilization of I/O resources, improved storage capacity, improved efficiency for reverse operations, among other possibilities.

Figure 9:
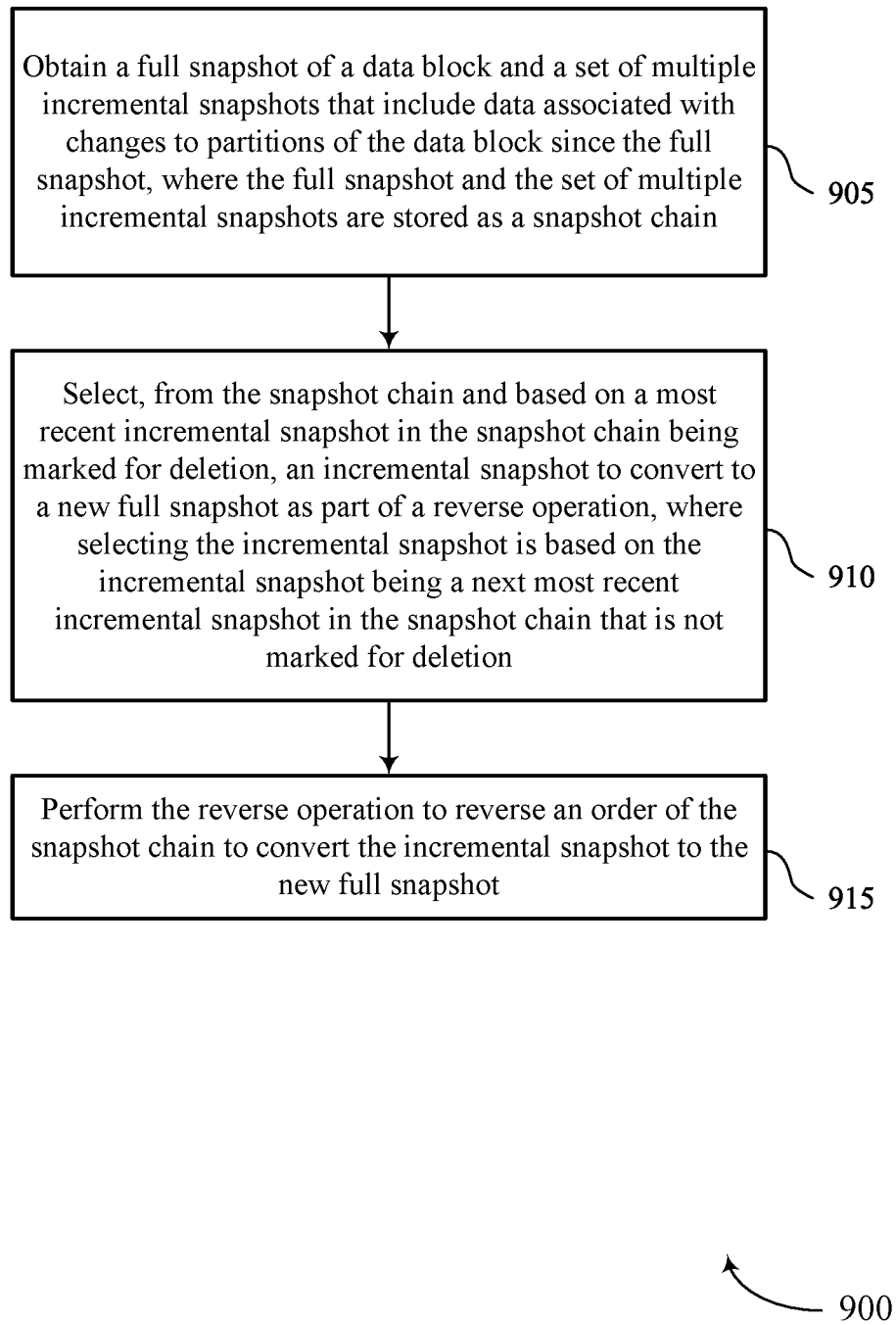
FIGS. 9 through 11 show flowcharts illustrating methods that support full snapshot selection for reverse operations in accordance with aspects of the present disclosure.

FIG. 9 shows a flowchart illustrating a method 900 that supports full snapshot selection for reverse operations in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include obtaining a full snapshot of a data block and a set of multiple incremental snapshots that include data associated with changes to partitions of the data block since the full snapshot, where the full snapshot and the set of multiple incremental snapshots are stored as a snapshot chain. The operations of block 905 may be performed in accordance with examples as disclosed herein. In some examples, aspects of the operations of 905 may be performed by a snapshot component 725 as described with reference to FIG. 7.

At 910, the method may include selecting, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion. The operations of block 910 may be performed in accordance with examples as disclosed herein. In some examples, aspects of the operations of 910 may be performed by a full snapshot selection component 730 as described with reference to FIG. 7.

At 915, the method may include performing the reverse operation to reverse an order of the snapshot chain to convert the incremental snapshot to the new full snapshot. The operations of block 915 may be performed in accordance with examples as disclosed herein. In some examples, aspects of the operations of 915 may be performed by a reverse operation component 735 as described with reference to FIG. 7.

Figure 10:
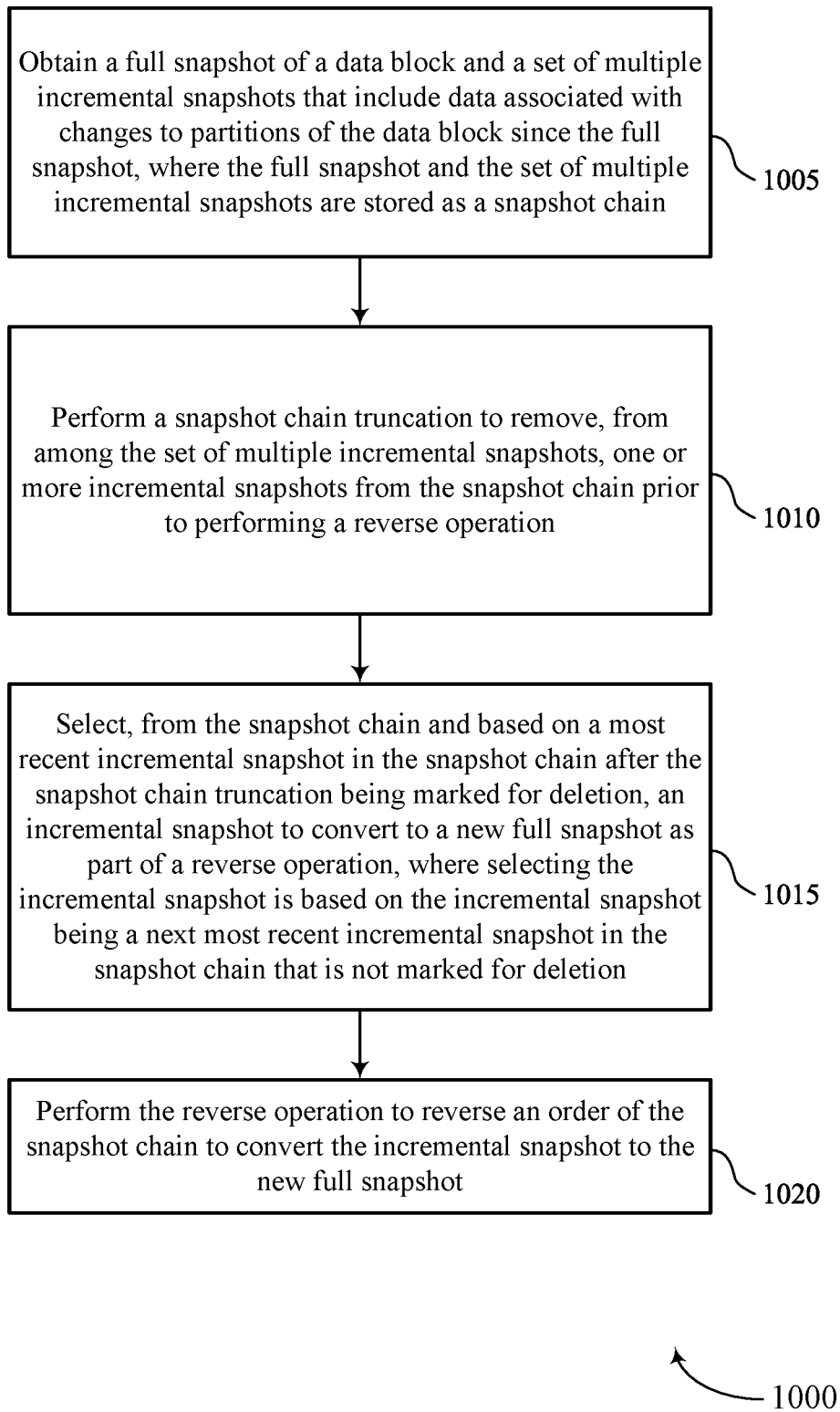

FIG. 10 shows a flowchart illustrating a method 1000 that supports full snapshot selection for reverse operations in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include obtaining a full snapshot of a data block and a set of multiple incremental snapshots that include data associated with changes to partitions of the data block since the full snapshot, where the full snapshot and the set of multiple incremental snapshots are stored as a snapshot chain. The operations of block 1005 may be performed in accordance with examples as disclosed herein. In some examples, aspects of the operations of 1005 may be performed by a snapshot component 725 as described with reference to FIG. 7.

At 1010, the method may include performing a snapshot chain truncation to remove, from among the set of multiple incremental snapshots, one or more incremental snapshots from the snapshot chain prior to performing a reverse operation. The operations of block 1010 may be performed in accordance with examples as disclosed herein. In some examples, aspects of the operations of 1010 may be performed by a truncation component 740 as described with reference to FIG. 7.

At 1015, the method may include selecting, from the snapshot chain and based on a most recent incremental snapshot in the snapshot chain after the snapshot chain truncation being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion. The operations of block 1015 may be performed in accordance with examples as disclosed herein. In some examples, aspects of the operations of 1015 may be performed by a full snapshot selection component 730 as described with reference to FIG. 7.

At 1020, the method may include performing the reverse operation to reverse an order of the snapshot chain to convert the incremental snapshot to the new full snapshot. The operations of block 1020 may be performed in accordance with examples as disclosed herein. In some examples, aspects of the operations of 1020 may be performed by a reverse operation component 735 as described with reference to FIG. 7.

Figure 11:
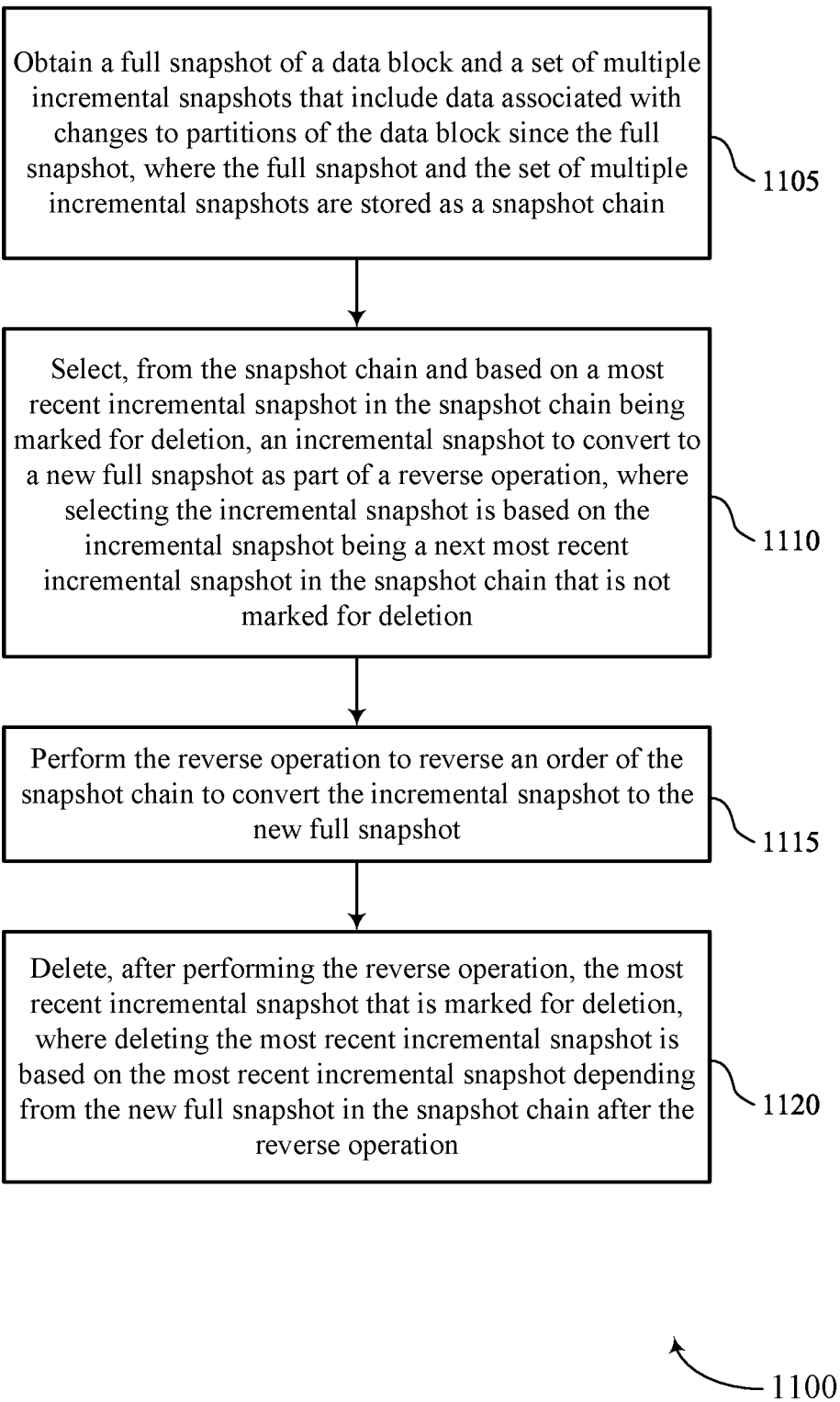

FIG. 11 shows a flowchart illustrating a method 1100 that supports full snapshot selection for reverse operations in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include obtaining a full snapshot of a data block and a set of multiple incremental snapshots that include data associated with changes to partitions of the data block since the full snapshot, where the full snapshot and the set of multiple incremental snapshots are stored as a snapshot chain. The operations of block 1105 may be performed in accordance with examples as disclosed herein. In some examples, aspects of the operations of 1105 may be performed by a snapshot component 725 as described with reference to FIG. 7.

At 1110, the method may include selecting, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion. The operations of block 1110 may be performed in accordance with examples as disclosed herein. In some examples, aspects of the operations of 1110 may be performed by a full snapshot selection component 730) as described with reference to FIG. 7.

At 1115, the method may include performing the reverse operation to reverse an order of the snapshot chain to convert the incremental snapshot to the new full snapshot. The operations of block 1115 may be performed in accordance with examples as disclosed herein. In some examples, aspects of the operations of 1115 may be performed by a reverse operation component 735 as described with reference to FIG. 7.

At 1120, the method may include deleting, after performing the reverse operation, the most recent incremental snapshot that is marked for deletion, where deleting the most recent incremental snapshot is based on the most recent incremental snapshot depending from the new full snapshot in the snapshot chain after the reverse operation. The operations of block 1120 may be performed in accordance with examples as disclosed herein. In some examples, aspects of the operations of 1120 may be performed by a garbage collection component 745 as described with reference to FIG. 7.

A method by an apparatus is described. The method may include obtaining a full snapshot of a data block and a set of multiple incremental snapshots that include data associated with changes to partitions of the data block since the full snapshot, where the full snapshot and the set of multiple incremental snapshots are stored as a snapshot chain, selecting, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion, and performing the reverse operation to reverse an order of the snapshot chain to convert the incremental snapshot to the new full snapshot.

An apparatus is described. The apparatus may include one or more memories storing processor executable code, and one or more processors coupled with the one or more memories. The one or more processors may individually or collectively operable to execute the code to cause the apparatus to obtain a full snapshot of a data block and a set of multiple incremental snapshots that include data associated with changes to partitions of the data block since the full snapshot, where the full snapshot and the set of multiple incremental snapshots are stored as a snapshot chain, select, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion, and perform the reverse operation to reverse an order of the snapshot chain to convert the incremental snapshot to the new full snapshot.

Another apparatus is described. The apparatus may include means for obtaining a full snapshot of a data block and a set of multiple incremental snapshots that include data associated with changes to partitions of the data block since the full snapshot, where the full snapshot and the set of multiple incremental snapshots are stored as a snapshot chain, means for selecting, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion, and means for performing the reverse operation to reverse an order of the snapshot chain to convert the incremental snapshot to the new full snapshot.

A non-transitory computer-readable medium storing code is described. The code may include instructions executable by one or more processors to obtain a full snapshot of a data block and a set of multiple incremental snapshots that include data associated with changes to partitions of the data block since the full snapshot, where the full snapshot and the set of multiple incremental snapshots are stored as a snapshot chain, select, from the snapshot chain and based on a most recent incremental snapshot in the snapshot chain being marked for deletion, an incremental snapshot to convert to a new full snapshot as part of a reverse operation, where selecting the incremental snapshot is based on the incremental snapshot being a next most recent incremental snapshot in the snapshot chain that is not marked for deletion, and perform the reverse operation to reverse an order of the snapshot chain to convert the incremental snapshot to the new full snapshot.

Some examples of the method, apparatus, and non-transitory computer-readable medium described herein may further include operations, features, means, or instructions for performing a snapshot chain truncation to remove, from among the set of multiple incremental snapshots, one or more incremental snapshots from the snapshot chain prior to performing the reverse operation, where the most recent incremental snapshot in the snapshot chain may be a most recent snapshot in the snapshot chain after the snapshot chain truncation.

In some examples of the method, apparatus, and non-transitory computer-readable medium described herein, performing the snapshot chain truncation may include operations, features, means, or instructions for performing the snapshot chain truncation based on a size of the snapshot chain being greater than a threshold size associated with the reverse operation, the threshold size corresponding to a threshold amount of data stored in the snapshot chain, where a second size of the snapshot chain after the snapshot chain truncation may be less than or equal to the threshold size.

In some examples of the method, apparatus, and non-transitory computer-readable medium described herein, performing the snapshot chain truncation may include operations, features, means, or instructions for performing the snapshot chain truncation based on a length of the snapshot chain being greater than a threshold length associated with the reverse operation, the threshold length corresponding to a threshold quantity of snapshots included in the snapshot chain, where a second length of the snapshot chain after the snapshot chain truncation may be less than or equal to the threshold length.

Some examples of the method, apparatus, and non-transitory computer-readable medium described herein may further include operations, features, means, or instructions for deleting, after performing the reverse operation, the most recent incremental snapshot that may be marked for deletion, where deleting the most recent incremental snapshot may be based on the most recent incremental snapshot depending from the new full snapshot in the snapshot chain after the reverse operation.

Some examples of the method, apparatus, and non-transitory computer-readable medium described herein may further include operations, features, means, or instructions for consolidating, after performing the reverse operation, expired data in the most recent incremental snapshot that may be marked for deletion with second data in a second incremental snapshot that may be obtained after the most recent incremental snapshot, where consolidating the expired data may be based on the most recent incremental snapshot depending from the new full snapshot in the snapshot chain after the reverse operation and deleting the expired data that remains in the most recent incremental snapshot after consolidating the expired data with the second data in the second incremental snapshot.

In some examples of the method, apparatus, and non-transitory computer-readable medium described herein, consolidating the expired data may include operations, features, means, or instructions for writing, for a partition of the partitions of the data block, the expired data that may be in the partition from the most recent incremental snapshot to the second incremental snapshot based on the second data in the second incremental snapshot including an empty data set in the partition and skipping writing, for the partition of the partitions of the data block, the expired data that may be in the partition from the most recent incremental snapshot to the second incremental snapshot based on the second data in the second incremental snapshot including data in the partition.

In some examples of the method, apparatus, and non-transitory computer-readable medium described herein, performing the reverse operation may include operations, features, means, or instructions for writing, for a first partition from among the partitions of the data block, data associated with the first partition from a first snapshot in the snapshot chain that includes a most recent version of the data in the first partition to a second snapshot, where writing to the second snapshot may be based on the second snapshot satisfying a set of conditions, and where the set of conditions include the second snapshot being a most recent snapshot in the snapshot chain that may have an empty data set in the first partition and the second snapshot not being marked for deletion and deleting, as part of the reverse operation and after writing the data, one or more snapshots in the snapshot chain based on the one or more snapshots being marked for deletion.

Some examples of the method, apparatus, and non-transitory computer-readable medium described herein may further include operations, features, means, or instructions for receiving an indication that one or more snapshots of the snapshot chain may be marked for deletion by a user, the one or more snapshots including at least the most recent incremental snapshot.

In some examples of the method, apparatus, and non-transitory computer-readable medium described herein, subsequent to completion of the reverse operation, the incremental snapshot may be converted to the new full snapshot based on the new full snapshot including a most recent version of the data in all of the partitions of the data block.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a.," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    obtaining a full snapshot of a data block and a plurality of incremental snapshots that comprise data associated with changes to partitions of the data block since the full snapshot, wherein the full snapshot and the plurality of incremental snapshots are stored as a snapshot chain;
    selecting, from the snapshot chain and based at least in part on a most recent incremental snapshot in the snapshot chain being marked for deletion, an incremental snapshot to convert to a new full snapshot as part of a reverse operation, wherein selecting the incremental snapshot is based at least in part on the incremental snapshot being a next most recent incremental snapshot in the snapshot chain that is not marked for deletion; and
    performing the reverse operation to reverse an order of the snapshot chain to convert the incremental snapshot to the new full snapshot.

2. The method of claim 1, further comprising:
    performing a snapshot chain truncation to remove, from among the plurality of incremental snapshots, one or more incremental snapshots from the snapshot chain prior to performing the reverse operation, wherein the most recent incremental snapshot in the snapshot chain is a most recent snapshot in the snapshot chain after the snapshot chain truncation.

3. The method of claim 2, wherein performing the snapshot chain truncation comprises:
    performing the snapshot chain truncation based at least in part on a size of the snapshot chain being greater than a threshold size associated with the reverse operation, the threshold size corresponding to a threshold amount of data stored in the snapshot chain, wherein a second size of the snapshot chain after the snapshot chain truncation is less than or equal to the threshold size.

4. The method of claim 2, wherein performing the snapshot chain truncation comprises:
    performing the snapshot chain truncation based at least in part on a length of the snapshot chain being greater than a threshold length associated with the reverse operation, the threshold length corresponding to a threshold quantity of snapshots included in the snapshot chain, wherein a second length of the snapshot chain after the snapshot chain truncation is less than or equal to the threshold length.

5. The method of claim 1, further comprising:
    deleting, after performing the reverse operation, the most recent incremental snapshot that is marked for deletion, wherein deleting the most recent incremental snapshot is based at least in part on the most recent incremental snapshot depending from the new full snapshot in the snapshot chain after the reverse operation.

6. The method of claim 1, further comprising:
    consolidating, after performing the reverse operation, expired data in the most recent incremental snapshot that is marked for deletion with second data in a second incremental snapshot that is obtained after the most recent incremental snapshot, wherein consolidating the expired data is based at least in part on the most recent incremental snapshot depending from the new full snapshot in the snapshot chain after the reverse operation; and deleting the expired data that remains in the most recent incremental snapshot after consolidating the expired data with the second data in the second incremental snapshot.

7. The method of claim 6, wherein consolidating the expired data comprises:

writing, for a partition of the partitions of the data block, the expired data that is in the partition from the most recent incremental snapshot to the second incremental snapshot based at least in part on the second data in the second incremental snapshot comprising an empty data set in the partition; or skipping writing, for the partition of the partitions of the data block, the expired data that is in the partition from the most recent incremental snapshot to the second incremental snapshot based at least in part on the second data in the second incremental snapshot comprising data in the partition.

8. The method of claim 1, wherein performing the reverse operation comprises:

writing, for a first partition from among the partitions of the data block, data associated with the first partition from a first snapshot in the snapshot chain that includes a most recent version of the data in the first partition to a second snapshot, wherein writing to the second snapshot is based at least in part on the second snapshot satisfying a set of conditions, and wherein the set of conditions comprise the second snapshot being a most recent snapshot in the snapshot chain that has an empty data set in the first partition and the second snapshot not being marked for deletion; and deleting, as part of the reverse operation and after writing the data, one or more snapshots in the snapshot chain based at least in part on the one or more snapshots being marked for deletion.

9. The method of claim 1, further comprising:

receiving an indication that one or more snapshots of the snapshot chain are marked for deletion by a user, the one or more snapshots comprising at least the most recent incremental snapshot.

10. The method of claim 1, wherein subsequent to completion of the reverse operation, the incremental snapshot is converted to the new full snapshot based at least in part on the new full snapshot comprising a most recent version of the data in all of the partitions of the data block.

11. An apparatus, comprising:

one or more memories storing processor-executable code; and one or more processors coupled with the one or more memories and individually or collectively operable to execute the code to cause the apparatus to:

obtain a full snapshot of a data block and a plurality of incremental snapshots that comprise data associated with changes to partitions of the data block since the full snapshot, wherein the full snapshot and the plurality of incremental snapshots are stored as a snapshot chain;

select, from the snapshot chain and based at least in part on a most recent incremental snapshot in the snapshot chain being marked for deletion, an incremental snapshot to convert to a new full snapshot as part of a reverse operation, wherein selecting the incremental snapshot is based at least in part on the incremental snapshot being a next most recent incremental snapshot in the snapshot chain that is not marked for deletion; and perform the reverse operation to reverse an order of the snapshot chain to convert the incremental snapshot to the new full snapshot.

12. The apparatus of claim 11, wherein the one or more processors are individually or collectively further operable to execute the code to cause the apparatus to:

perform a snapshot chain truncation to remove, from among the plurality of incremental snapshots, one or more incremental snapshots from the snapshot chain prior to performing the reverse operation, wherein the most recent incremental snapshot in the snapshot chain is a most recent snapshot in the snapshot chain after the snapshot chain truncation.

13. The apparatus of claim 12, wherein, to perform the snapshot chain truncation, the one or more processors are individually or collectively operable to execute the code to cause the apparatus to:

perform the snapshot chain truncation based at least in part on a size of the snapshot chain being greater than a threshold size associated with the reverse operation, the threshold size corresponding to a threshold amount of data stored in the snapshot chain, wherein a second size of the snapshot chain after the snapshot chain truncation is less than or equal to the threshold size.

14. The apparatus of claim 12, wherein, to perform the snapshot chain truncation, the one or more processors are individually or collectively operable to execute the code to cause the apparatus to:

perform the snapshot chain truncation based at least in part on a length of the snapshot chain being greater than a threshold length associated with the reverse operation, the threshold length corresponding to a threshold quantity of snapshots included in the snapshot chain, wherein a second length of the snapshot chain after the snapshot chain truncation is less than or equal to the threshold length.

15. The apparatus of claim 11, wherein the one or more processors are individually or collectively further operable to execute the code to cause the apparatus to:

delete, after performing the reverse operation, the most recent incremental snapshot that is marked for deletion, wherein deleting the most recent incremental snapshot is based at least in part on the most recent incremental snapshot depending from the new full snapshot in the snapshot chain after the reverse operation.

16. The apparatus of claim 11, wherein the one or more processors are individually or collectively further operable to execute the code to cause the apparatus to:

consolidate, after performing the reverse operation, expired data in the most recent incremental snapshot that is marked for deletion with second data in a second incremental snapshot that is obtained after the most recent incremental snapshot, wherein consolidating the expired data is based at least in part on the most recent incremental snapshot depending from the new full snapshot in the snapshot chain after the reverse operation; and delete the expired data that remains in the most recent incremental snapshot after consolidating the expired data with the second data in the second incremental snapshot.

17. The apparatus of claim 16, wherein, to consolidate the expired data, the one or more processors are individually or collectively operable to execute the code to cause the apparatus to:
  write, for a partition of the partitions of the data block, the expired data that is in the partition from the most recent incremental snapshot to the second incremental snapshot based at least in part on the second data in the second incremental snapshot comprising an empty data set in the partition: or
  skip writing, for the partition of the partitions of the data block, the expired data that is in the partition from the most recent incremental snapshot to the second incremental snapshot based at least in part on the second data in the second incremental snapshot comprising data in the partition.

18. A non-transitory computer-readable medium storing code, the code comprising instructions executable by one or more processors to:
  obtain a full snapshot of a data block and a plurality of incremental snapshots that comprise data associated with changes to partitions of the data block since the full snapshot, wherein the full snapshot and the plurality of incremental snapshots are stored as a snapshot chain;
  select, from the snapshot chain and based at least in part on a most recent incremental snapshot in the snapshot chain being marked for deletion, an incremental snapshot to convert to a new full snapshot as part of a reverse operation, wherein selecting the incremental snapshot is based at least in part on the incremental snapshot being a next most recent incremental snapshot in the snapshot chain that is not marked for deletion; and
  perform the reverse operation to reverse an order of the snapshot chain to convert the incremental snapshot to the new full snapshot.

19. The non-transitory computer-readable medium of claim 18, wherein the instructions are further executable by the one or more processors to:
  perform a snapshot chain truncation to remove, from among the plurality of incremental snapshots, one or more incremental snapshots from the snapshot chain prior to performing the reverse operation, wherein the most recent incremental snapshot in the snapshot chain is a most recent snapshot in the snapshot chain after the snapshot chain truncation.

20. The non-transitory computer-readable medium of claim 19, wherein the instructions to perform the snapshot chain truncation are executable by the one or more processors to:
  perform the snapshot chain truncation based at least in part on a size of the snapshot chain being greater than a threshold size associated with the reverse operation, the threshold size corresponding to a threshold amount of data stored in the snapshot chain, wherein a second size of the snapshot chain after the snapshot chain truncation is less than or equal to the threshold size.

* * * * *